(12) United States Patent
Kuwahara et al.

(10) Patent No.: US 7,382,393 B2
(45) Date of Patent: Jun. 3, 2008

(54) OPTICAL DISK DEVICE

(75) Inventors: Masaya Kuwahara, Hyogo (JP); Kei Kobayashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 238 days.

(21) Appl. No.: 11/185,746

(22) Filed: Jul. 21, 2005

(65) Prior Publication Data
US 2006/0017803 A1 Jan. 26, 2006

(30) Foreign Application Priority Data
Jul. 21, 2004 (JP) ............................ P2004-212809

(51) Int. Cl.
*B41J 2/435* (2006.01)
*G01D 15/14* (2006.01)
(52) U.S. Cl. ...................................... 347/248; 347/224
(58) Field of Classification Search ................ 347/224, 347/248; 369/30.12, 30.13
See application file for complete search history.

(56) References Cited
U.S. PATENT DOCUMENTS
7,084,835 B1 * 8/2006 McCormick et al. ....... 343/890

| 2002/0191517 A1* | 12/2002 | Honda et al. ............ 369/53.29 |
| 2004/0057356 A1* | 3/2004 | Morishima ................ 369/47.4 |
| 2004/0114500 A1 | 6/2004 | McClellan et al. |
| 2004/0136291 A1* | 7/2004 | Hayashi ..................... 369/53.2 |
| 2006/0256677 A1* | 11/2006 | Bahng ....................... 369/47.1 |

FOREIGN PATENT DOCUMENTS
JP 2002-203321 A 7/2002
JP 2003-203348 A 7/2003

\* cited by examiner

*Primary Examiner*—Hai C Pham
*Assistant Examiner*—Kainoa B Wright
(74) *Attorney, Agent, or Firm*—McDermott Will & Emery LLP

(57) ABSTRACT

Provided is an optical disk device for performing label recording by irradiating a light beam onto a label recording face of an optical disk, which is at a position different from that of a disk recording face, wherein label recording on the label recording face is performed by using tracking control information of the light beam irradiation which is performed by the optical pickup for the tracks of the disk recording face. Thereby, high-quality label images can be recorded on the label recording face of the optical disk.

10 Claims, 17 Drawing Sheets

FIG. 3

TR-D1: Driving Current to be Stored in First Storage Device $$D1 = (10[mA] \times 100 / 120) = 8.3[mA]$$

OPTICAL DISK DEVICE

FIELD OF THE INVENTION

The present invention relates to an optical disk device which performs label recording by irradiating light beams onto a label recording face of an optical disk, which is different from a disk recording face.

BACKGROUND OF THE INVENTION

In accordance with the recent developments in IT industry, there has been a remarkable widespread of optical disks which can record a vast amount of multimedia information. Currently, optical disks of various types such as CD-R, CD-RW, CD-ROM, DVD-RAM, DVD-ROM, and the like are used widely and generally on a daily basis. In addition, disk drives or the like for performing writing (recording) and reading-out (reproducing) of information to/from a disk recording face of an optical disk have come into wide use. Furthermore, label printers capable of recording characters, images, symbols, and the like on a face (label recording face) on the opposite side of a disk recording face have also become popular.

There are various types in the label printers, e.g. a type which is formed separately and independently from a recording/reproducing device or a personal computer, such as an optical disk, or a type which is built in the recording/reproducing device or the personal computer. As one of these label printers, for example, Japanese Patent Unexamined Publication No. 2002-203321 discloses a recording/reproducing device wherein an optical disk is rotated at a constant of rotating number, and an optical pickup is driven to the radius direction of the optical disk by a prescribed amount by every prescribed rotational position. Furthermore, Japanese Patent Unexamined Publication No. 2003-203348 discloses a recording/reproducing device wherein a focus control for controlling the position shift between a label recording face of an optical disk and a light beam spot controls light beam diameter in accordance with reflected return light of a light beam which is irradiated onto the label face of the optical disk.

In the optical disk device according to Japanese Patent Unexamined Publication No. 2002-203321, aged deterioration and the like of an actuator which condenses light on the label recording face of the optical disk causes variation of the light beam position for a prescribed amount of driving signal, etc. Thus, there raises such a problem that the quality of the recording image formed on the label recording face of the optical disk is deteriorated.

In the optical disk device according to Japanese Patent Unexamined Publication No. 2003-203348, it is not possible to detect the position shift amount between the label recording face and the light beam when the light reflectivity of the label recording face is extremely deteriorated or there are uneven areas on the label recording face. Therefore, there is a position shift generated between the label recording face and the light beam so that the light beam diameter cannot be controlled, thus causing such a problem that the quality of the recording image on the label recording face is deteriorated.

Moreover, there has been proposed a CLV system as an optical disk device which records a label image on a label recording face, wherein the intensity of light beams irradiated from an optical pickup is controlled to be constant and recording is performed while changing the rotating number of a rotary device of the optical disk. However, address information specifying the irradiation position of the light beam is not recorded on the label recording face. Thus, control of the rotary device becomes unstable. As a result, there raises such a problem that the quality of the recording image formed on the label recording face is deteriorated.

Furthermore, the time required for forming the recording image on the label recording face and the resolution of the image are constant. Thus, there raises such a problem that it cannot meet the demands, that is, to shorten the time required for excellent recording on the label recording face even though the resolution is not good.

SUMMARY OF THE INVENTION

It is, therefore, a main object of the present invention to provide an optical disk device capable of performing high-quality label recording through a control, which is similar to a tracking control and a traverse control performed on a disk recording face, performed on a label recording face without any tracks.

Another object of the present invention is to provide an optical disk device capable of performing high-quality label recording through a CLV system which makes the rotation speed of the optical disk constant with respect to the label recording face having no address information.

Still another object of the present invention is to provide an optical disk device capable of performing high-quality label recording through a focus control, which is equivalent to that of the disk recording face, performed on the label recording face with uneven areas.

A further object of the present invention is to provide an optical disk device which can select label recording giving priority to the recording speed and label recording giving priority to the resolution of the image.

In order to achieve the aforementioned objects, the present invention as been designed as follows:

(1) The optical disk according to a first aspect of the present invention is an optical disk device for performing label recording by irradiating a light beam onto a label recording face of an optical disk, which is at a position different from a disk recording face, wherein light beam control information performed by an optical pickup for tracks of the disk recording face is used for recording a label on the label recording face.

The light beam irradiation control information may be the control information of both the tracking control and the traverse control, or may be the control information of either one.

Further, the disk recording face and the label recording face are preferable to be a flat face. It is preferable that the disk recording face be one of the faces of the optical disk and that the label recording face be the other face of the optical disk.

On the disk recording face, there are grooves (tracks) for the tracking control and the traverse control. However, there is no such track formed on the label recording face.

With the optical disk device according to the first aspect of the present invention, even if there is no such groove for the tracking control and the traverse control, similar to those of the disk recording face, formed on the label recording face, high-quality label recording can be performed on the label recording face by performing a control equivalent to those controls.

It is preferable that the optical disk device according to the first aspect of the present invention comprise a storage device for storing light beam irradiation control information and use the light beam irradiation control information stored in the storage device for recording a label on the label recording face. Since the light beam irradiation control information is stored in the storage device, high-quality label recording can be continuously performed on the label recording face. Further, the light beam irradiation control information stored in the storage device can be updated and changed, so that more accurate and high-quality label recording can be performed easily.

It is preferable that the optical disk device according to the first aspect of the present invention comprise a moving device for moving the irradiation position of the light beam and the storage device store light beam irradiation control information performed by the moving device. Since the data by the moving device is used as the light beam irradiation control information, accurate label recording can be performed. The moving device may include a tracking actuator and an objective lens.

It is preferable that the optical disk device according to the first aspect of the present invention comprise a transfer table for mounting the moving device and the storage device store light beam irradiation control information performed through transfer of the transfer table.

It is preferable that the optical disk device according to the first aspect of the present invention comprise a moving device for moving the irradiation position of the light beam, and a transfer table for mounting the moving mean, and that the storage device store light beam irradiation control information performed by the moving device and the storage device store light beam irradiation control information performed through transfer of the transfer table.

It is preferable that the optical disk device according to the first aspect of the present invention comprise a counter for performing count action in accordance with shift of the transfer table, and that the storage device use a count value of the counter as light beam irradiation control information performed through the shift of the transfer table.

It is preferable that the stored contents of the storage device be updated.

(2) The optical disk device according to a second aspect of the present invention is an optical disk device for performing label recording by irradiating a light beam onto a label recording face of an optical disk, which is at a position different from a disk recording face, the apparatus comprising a rotary device for rotation-driving the optical disk, and a position detector for detecting a radius-direction irradiation position of the light beam for the optical disk, wherein circumferential speed by the rotary device at an arbitrary position in a radius direction of the optical disk is controlled constant according to a detection output of the position detector.

It is preferable that the optical disk device according to the second aspect of the present invention comprise a transfer device which transfers, in a radius direction of the optical disk, an optical pickup for irradiating a light beam onto the optical disk, and that the position detector performs counting action in accordance with shift of the transfer device and use obtained count value for position detection of the light beam. The position detector includes a detector for detecting the radius-direction irradiation position of the light beam by the shift of the objective lens and the like, a detector for detecting the radius-direction irradiation position of the light beam by the transfer of the transfer table which mounts and transfers the optical pickup, etc.

With the optical disk device according to the second aspect of the present invention, high-quality label recording can be performed on the label recording face having no address information by a CVL system in which the rotation speed of the optical disk is set constant.

In the optical disk device according to the second aspect of the present invention, it is preferable that the position detector perform the counting action in accordance with the shift of the transfer device and use the count value for position detection of the transfer device.

(3) The optical disk device according to a third aspect of the present invention is an optical disk device for performing label recording by irradiating a light beam onto a label recording face of an optical disk, which is at a position different from a disk recording face, the apparatus comprising a focus actuator for arbitrarily moving focus position of a light beam in a vertical direction of the disk recording face, and a storage device for storing a driving signal for the focus actuator for performing either recording or reproduction of data to/from the disk recording face, wherein the focus position of the light beam with respect to the label recording face is set by using the driving signal of the focus actuator stored in the storage device.

With the optical disk device according to the third aspect of the present invention, even if there are uneven areas on the label recording face, it is possible to perform high-quality label recording by preventing the focus deviation on the label recording face through performing a control equivalent to the focus control performed on the disk recording face.

It is preferable that the optical disk device according to the third aspect of the present invention comprise a return light detector for detecting return light of the light beam to the disk recording face, and that the storage device store a driving signal for the focus actuator, which is obtained when return light detected by the return light detector at the time of performing either recording or reproduction of data to/from the disk recording face become a prescribed value or more.

It is preferable that the optical disk device according to the third aspect of the present invention comprise a data jitter detector for detecting jitter of data recorded in the optical disk from the return light of the light beam irradiated to the disk recording face, and that the storage device store a driving signal for the focus actuator, which is obtained when data jitter detected by the data jitter detector at the time of performing either recording or reproduction of data to/from the disk recording face become a prescribed value or less.

It is preferable that the optical disk device according to the third aspect of the present invention comprise a tracking error detector for detecting position shift of a track and a light beam spot from the return light of the light beam irradiated to the disk recording face, and that the storage device store a driving signal for the focus actuator, which is obtained when an output amplitude of a tracking error detected by the tracking error detector at the time of performing either recording or reproduction of data to/from the disk recording face become a prescribed value or more.

In the optical disk device according to the third aspect of the present invention, it is preferable that the storage device update the driving signal for the focus actuator as the stored value every time when either the recording or reproduction of data is performed to/from the disk recording face.

(4) The optical disk device according to a fourth aspect of the present invention is an optical disk device for performing label recording by irradiating a light beam onto a label recording face of an optical disk, which is at a position different from a disk recording face, the apparatus comprising a storage device for storing data indicating whether the priority is given to recording speed of label recording performed on the label recording face or to resolution of label recording image, and a selecting device for selecting the data stored in the storage device, wherein a light beam is moved on the label recording face at a high speed when data selected from the storage device by the selecting device is a first data which gives priority to the recording speed of the label recording rather than the resolution, and moves the light beam on the label recording face at a low speed when selected is a second data which gives priority to the resolution of the label recording image rather than the recording speed.

The optical disk device according to the fourth aspect of the present invention is an apparatus in which a light beam diameter irradiated onto the label recording face is increased when data is the first data, and light beam diameter irradiated onto the label recording face is decreased when the data is the second data which gives priority to the resolution of the label recording image rather than the recording speed.

It is preferable that the optical disk device according to the fourth aspect of the present invention comprise a speed controller for controlling speed of the light beam, and that the speed of the light beam be controlled by the speed controller.

It is preferable that the optical disk device according to the fourth aspect of the present invention comprise a light beam diameter controller for controlling size of the light beam diameter, and that the size of the light beam diameter be controlled by the light beam diameter controller.

With the optical disk device according to the fourth aspect of the present invention, it is possible to perform both the label recording giving priority to the label recording speed and the label recording giving priority to the resolution of the label image. Thus, it is possible to meet various demands of users.

BRIEF DESCRIPTION OF THE DRAWINGS

The present invention is illustrated be way of example and not limitation in the figures of the accompanying drawings, in which like references indicate similar elements and in which:

FIG. 3 is an illustration used for describing arithmetic operation of the data to be stored in the first storage device according to the first embodiment of the present invention;

DETAILED DESCRIPTION OF THE INVENTION

In the followings, preferred embodiments of the present invention will be described by referring to the accompanying drawings.

(1) Embodiments for the First Aspect of the Present Invention

First Embodiment

In the first preferred embodiment, on a label recording face without any tracks (grooves), label recording is performed by a tracking control, which is similar to that in the case of a disk recording face. In this embodiment, tracking control information, which is light beam irradiation control information used for recording information onto the disk recording face, is stored in advance. In accordance with the stored tracking control information, label recording is performed onto the label recording face.

Figure 1:
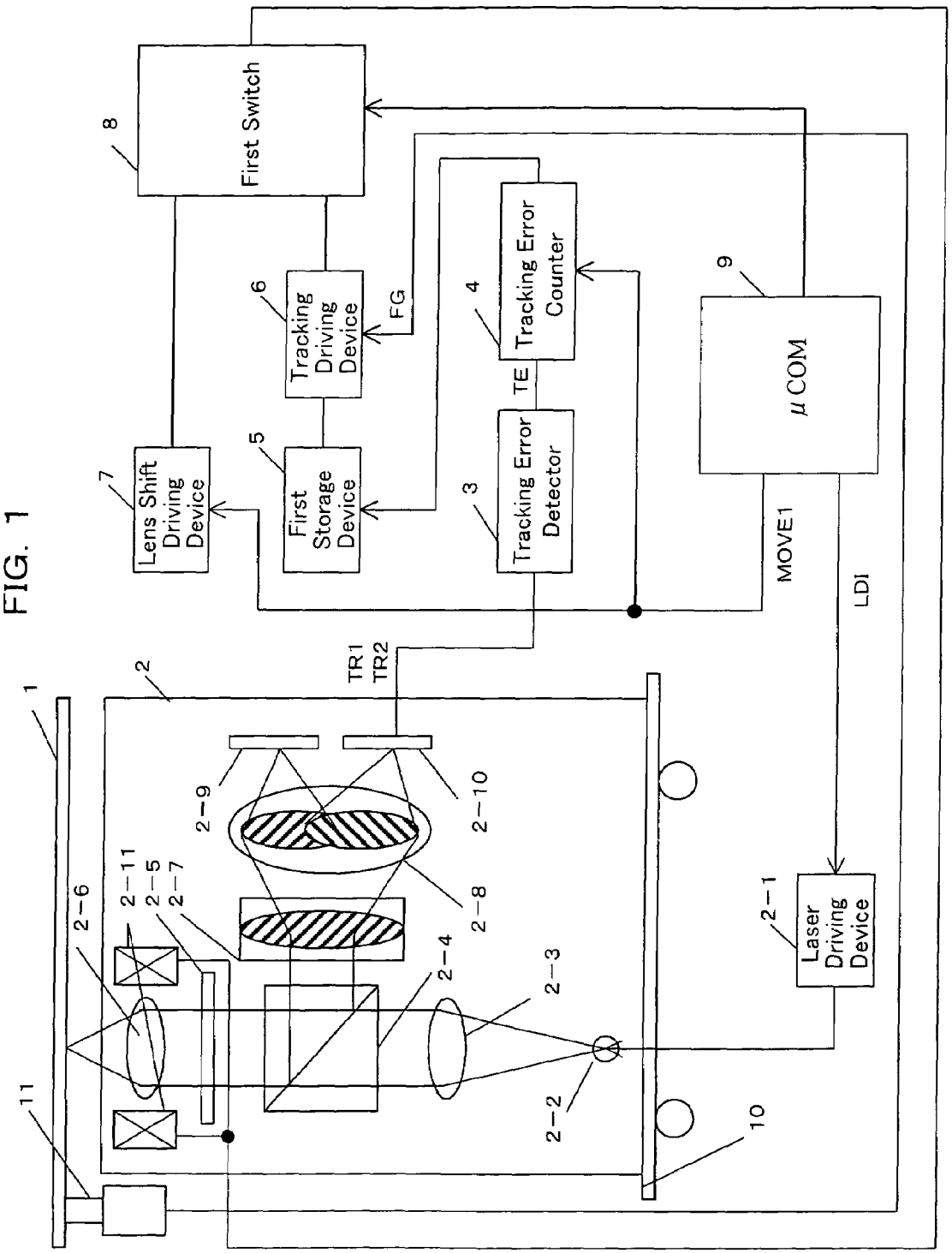
FIG. 1 is a block diagram of an optical disk device according to a first preferred embodiment of the present invention.

FIG. 1 shows the structure of the optical disk device according to this embodiment. Reference numeral 1 is an optical disk. In this embodiment, it may be any type selected from DVD-ROM<DVD-R, DVD+R, DVD-RW, and DVD+RW having track pitch of 0.74 (μm). In one of the faces of the optical disk 1, guide grooves (tracks) are formed from the inner peripheral side to the outer peripheral side along the circumferential direction as a disk recording face. Further, information which indicates data, flags, addresses and the like is provided the presence of the tracks. The other face of the optical disk 1 serves as a label recording face to which characters, images, or the like, which enables to identify the data recorded to the disk recording face are recorded as a label. The tracks and the grooves for recording address information as those of the disk recording face are not formed on the label recording face.

Reference numeral 2 is an optical pickup which comprises a laser driving device 2-1, a laser 2-2, a coupling lens 2-3, a beam splitter 2-4, a ¼ wave plate 2-5, an objective lens 2-6, a condenser lens 2-7, a detecting lens 2-8, a plus primary light detector 2-9, a minus primary light detector 2-10, and a tracking actuator 2-11. The tracking actuator 2-11 and the objective lens 2-6 form a moving device for moving the irradiation position of the light beam. The structural elements of the optical pickup 2 are well known so that the detail description will be omitted. The objective lens 2-6 is controlled to move in the tracking control direction of the optical disk 1 by the tracking actuator 2-11. The tracking actuator 2-11 is driven by a supply of driving current through a first switch 8 in accordance with selective switching of a lens shift driving device 7 and a tracking driving device 6.

Reference numeral 3 is a tracking error detector. The optical disk 1 is formed with a plastic material so that there is warping or swell generated therein by thermal strain or the like at the time of molding. Thus, there generates vertical run-out on the surface. Furthermore, when the optical disk 1 is mounted on a turn table, not shown, side run-out and track run-out are generated due to deflection or the like caused by the own weight of the optical disk 1 itself. Thus, the tracking error detector 3 detects the shift of the light beam from the regular position on the track, that is, the tracking error, caused by the side run-out and the track run-out. Specifically, it is detected according to output TR1, TR2 of the minus primary light detector 2-10 of the optical pickup 2. Particularly, the tracking error detector 3 is formed to output detection output indicating the vertical deflection of amplitude (TE) with respect to a reference voltage VerF every time the light beam crosses over the track of the optical disk 1.

Reference numeral 4 is a tracking error counter. The tracking error counter 4 performs counting action every time when the detected amplitude (TE) from the tracking error detector 3 exceeds the reference voltage VerF. The count value of the tracking error counter 4 indicates how many times the light beam crossed the tracks.

The relation of the lens shift driving device 7, the tracking error detector 3, and the tracking error counter 4 will be described by referring to FIG. 2. FIG. 2A is a graph in which the vertical axis is the driving current (mA) of the tracking actuator 2-11 by the lens shift driving device 7, and the horizontal axis is time (sec). FIG. 2B is a graph in which the vertical axis is the detection output (TE) (V) of the tracking error detector 3 and the horizontal axis is time (sec). FIG. 2C is a graph in which the vertical axis is the count value (number) the tracking error counter 4 and the horizontal axis is time (sec). First, as shown in FIG. 2A, during the time t0-t1, the driving current of the lens shift driving device 7 changes on the increase side from 0 (mA) to 10 (mA) by a constant ratio. The tracking actuator 2-11 is driven by this driving current and the objective lens 2-6 is moved in the tracking direction. With this, the tracking error output of the optical pickup 1 is detected by the tracking error detector 3 as shown in FIG. 2B. The detection output (TE) of the tracking error detector 3 is counted by the tracking error counter 4 as shown in FIG. 2C. That is, the count value of the tracking error counter 4 indicates the number of tracks crossed by the light beam by a constant move of the objective lens 2-6.

Reference numeral 5 is a first storage device. The first storage device 5 stores the count value of the tracking error counter 4. The count value can be updated for enabling to make corrections since there may be cases where the number of tracks to be crossed by the driving current shown in FIG. 2 changes between the time when the optical disk is shipped from the manufacture and the time when it is used by a user.

The stored contents of the first storage device 5 will be described by referring to FIG. 3. During the time t0-t1, the count value of the number of crossed tracks counted by the tracking error counter 4 at the time when the driving current of the lens shift driving device 7 is increased from 0 (mA) to 10 (mA) is one hundred twenty. In this case, for performing the tracking control to carry out label recording by a unit of one-hundred tracks to be crossed, the driving current of the lens shift driving device 7 corresponding to crossing the one-hundred-tracks is 8.3 (mA). The first storage device 5 stores 8.3 (mA) as information (tracking control information) for performing the tracking control for crossing one-hundred tracks during the time t0-t1. In this stored content, the driving current for crossing the one-hundred tracks is 8.3 (mA). However, there may be cases where the driving current for crossing the one-hundred tracks changes from 8.3 (mA) due to variations or aged deterioration of the tracking actuator 2-11 or the like. Therefore, the stored contents of the first storage device 5 can be updated for overcoming the inconveniences caused by the variations, aged deteriorations, or the like. For example, there may be a case or others where even if the driving current for crossing the one-hundred tracks is 8.3 (mA) at the time of shipping from factories, it becomes 9.5 (mA) when used by a user. Thus, it is preferable that this embodiment make it possible to cope with the inconveniences. FIG. 2 illustrates merely an example for implementing comprehension of the explanation.

Figure 4:
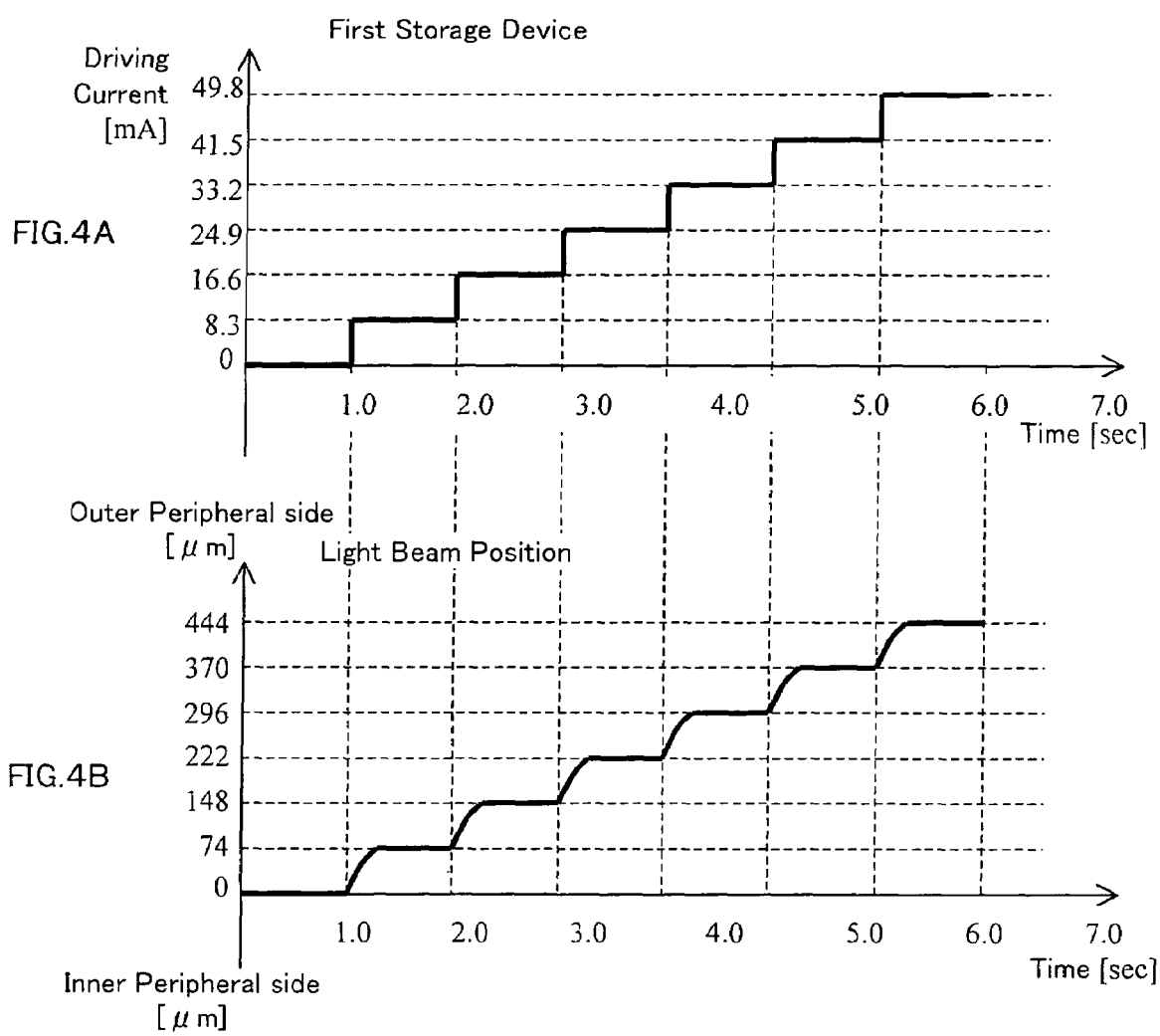
FIGS. 4A, 4B are graphs used for describing control which is performed according to the data stored in a first storage device according to the first embodiment of the present invention.

Reference numeral 6 is a tracking driving device. The tracking driving device 6 drives the tracking actuator 2-11, while making constant the speed of the track passing on the light beam at the time of tracking according to FG signal (a pulse signal which is generated once by every single rotation of the optical disk 1) which corresponds to rotation of a rotary motor 11. The position of the light beam by the tracking driving device 6 will be described by referring to FIG. 4. FIG. 4A is a graph in which the vertical axis is the driving current by the tracking driving device 6 and the horizontal axis is the time (sec). FIG. 4B is a graph in which the vertical axis is the position of the light beam irradiated towards the outer peripheral side with the innermost peripheral position of the optical disk 1 being 0 (μm), and the horizontal axis is the time (sec). As shown in FIG. 4A, the driving current increases by 8.3 (mA) after every one second. One second herein is set on assumption that the optical disk 1 rotates once in one second. First, before the time 0-1.0 second, the driving current from the tracking driving device 6 is 0 (mA) so that the tracking actuator 2-11 does not operate. Therefore, the objective lens 2-6 does not move in the tracking direction either, so that the light beam does not cross the track. Next, between the time 1.0-2.0 second, the tracking driving device 6 supplies the driving current 8.3 (mA), which corresponds to crossing one-hundred tracks, stored in the first storage device 5. Thereby, the objective lens 2-6 is controlled to move in the tracking direction and the light beam comes to a position crossing one-hundred tracks. Then, between the time 2.0-3.0 second, the tracking driving device 6 supplies the driving current 8.3 (mA), which corresponds to crossing one-hundred tracks, stored in the first storage device 5. Thereby, the objective lens 2-6 is further controlled to move in the tracking direction and the light beam comes to a position crossing another one-hundred tracks. With this, the light beam comes to a position crossing two-hundred tracks from the initial position. In this manner, the light beam can be driven in order from the inner peripheral side towards the outer peripheral side.

Reference numeral 7 is a lens shift driving device, 8 is a first switch, and 9 is a microcomputer. The microcomputer 9 performs drive control of the lens shift driving device 7, selective switching control of the first switch 8, the count control of the tracking error counter 4, and drive control of the laser driving device 2-1.

Reference numeral 10 is an optical pickup transfer table. The transfer table 10 constitutes a moving device for moving the irradiation position of the light beam by transferring the optical pickup 2. The transfer table 10 moves the light beam in the radius direction of the optical disk 1 by transferring the optical pickup 2. The movement of the optical pickup transfer table 10 is controlled by the microcomputer 9. Reference numeral 11 is a rotary motor as a rotary device for rotation-driving the optical disk 1.

As will be described in the followings, the optical disk device performs label recording through irradiating the light beam onto a label recording face of the optical disk 1, which is a face at a position different from that of the disk recording face.

First, described are the disk recording face and the label recording face of the optical disk 1. The disk recording face of the optical disk 1, as an effective data recording area, is set between the innermost circle and the outermost circle. In the effective recording area, a great number of tracks are formed in the radial direction at equal pitches. Correspondingly, the label recording face of the optical disk 1, as the effective label recording face, is set between the innermost circle at the same position as that of the above-mentioned innermost circle and the outermost circle at the same position as that of the above-mentioned outermost circle. However, unlike the disk recording face, tracks formed by the grooves are not provided on the label recording face. As shown in FIG. 4, for performing label recording at the position of 74 (μm) from the innermost circle of the label recording face, the tracking driving device 6 attains the data of 8.3 (mA), which is the driving current value corresponding to 74 (μm), from the first storage device 5. The tracking driving device 6 drives the tracking actuator 2-11 according to the driving current data from the first storage device 5. With this, the light beam can be moved for an amount of one-hundred tracks thereby enabling to perform label recording by the light beam thereof. Furthermore, for performing label recording at a position of 148 (μm) from the innermost circle of the label recording face, the tracking driving device 6 attains the data of 16.6 (mA), which is the driving current value corresponding to 148 (μm), from the first storage device 5. The tracking driving device 6 drives the tracking actuator 2-11 according to the driving current data from the first storage device 5. With this, the light beam can be moved for an amount of two-hundred tracks thereby enabling to perform label recording by the light beam thereof. Thereafter, label recording can be performed in the same manner by irradiating the light beam at the position of crossing a prescribed number of tracks.

It is noted that any one selected from DVD-ROM, DVD-R, DVD+R, DVD-RW, and DVD+RW may be used as the optical disk 1 to be used in the optical disk device of this embodiment. However, the same effect can be achieved in the case of CD-ROM, CD-R, CD-RW, or the like with the track pitch of 1.6 (μm) by setting the number of crossing tracks to be forty-six. Furthermore, in the case of DVD-RAM with the track pitch of 0.615 (μm), the same effect can be achieved by setting the number of crossing tracks to be one hundred twenty.

The optical disk 1 used in the optical disk device of this embodiment is provided with a heat sensitive layer which is sensitive to the irradiation heat of the light beam. For example, the heat sensitive layer develops colors by irradiation of the light beam thus forming a visible image. However, the present invention can be embodied by the optical disk 1 having no heat sensitive layer. For example, it is possible to stick a label sheet with a thermal color-developing characteristic onto the label recording face of the optical disk 1 and perform label recording on the label sheet. The same is true for other embodiments described below.

The optical disk device of this embodiment is a CLV (Constant Linear Velocity) system. However, it is not limited to this system but can be achieved by a CAV (Constant Angular Velocity) system. The same is true for other embodiments described below except for the second invention.

The optical disk device of this embodiment relates to the tracking control. However, it may be that of traverse control. The same is true for other embodiments described below.

The optical disk device of this embodiment is not limited to a disk form which uses the top face of the optical disk 1 as the disk recording face and the back face as the label recording face. It can be applied to a disk in which, on the same face, there is a disk recording face (disk recording part) provided partially for recording data by the tracking control or the like, and a label recording face (label recording part) provided partially where data is not recorded by the tracking control or the like. The same is true for other embodiments described below.

The optical disk 1 of this embodiment is not limited to a disk type and not intended to be limited to its name. It is possible to be applied to a disk in a rectangular shape or disks in others shapes. The same is true for other embodiments described below.

Second Preferred Embodiment

Figure 5:
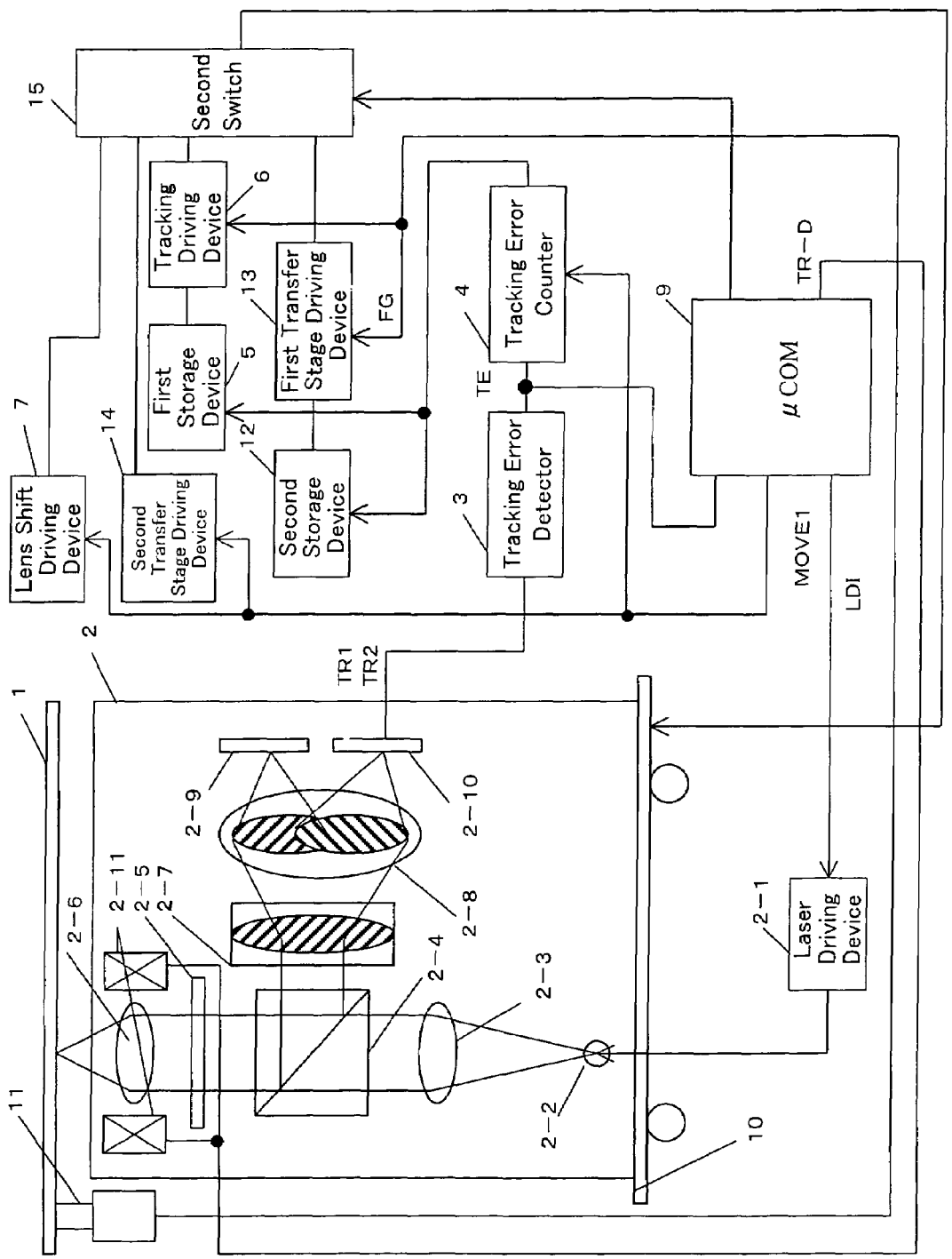
FIG. 5 is a block diagram of an optical disk device according to a second preferred embodiment of the present invention.

A second preferred embodiment will be described by referring to FIG. 5. FIG. 5 is an illustration for showing the block structure of an optical disk device according to the second preferred embodiment. The same reference numerals are applied to the elements which correspond or similar to those of the optical disk device shown in FIG. 1. In other embodiments described below, the same reference numerals are also applied to the corresponding elements. Like the first preferred embodiment, in this embodiment, the tracking control information of the light beam used for recording information to the disk recording face is stored in advance. Label recording is performed onto the label recording face according to the stored tracking control information. This embodiment is different from the first preferred embodiment in respect that a second storage device 12, a first transfer table driving device 13, and a second transfer table driving device 14 are provided in addition.

Figure 2:
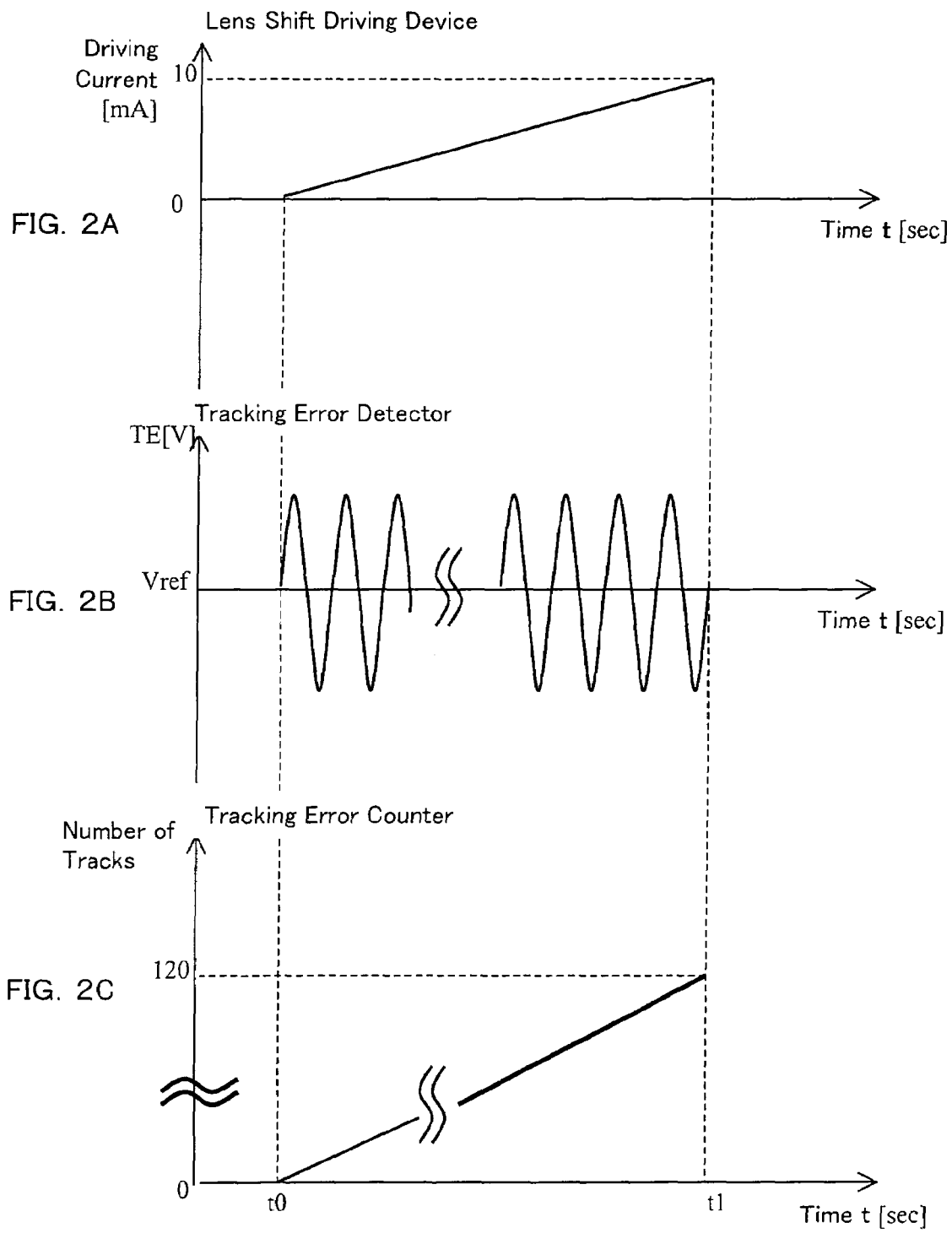
FIGS. 2A, 2B, 2C are graphs used for describing data to be stored in a first storage device according to the first embodiment of the present invention.
Figure 6:
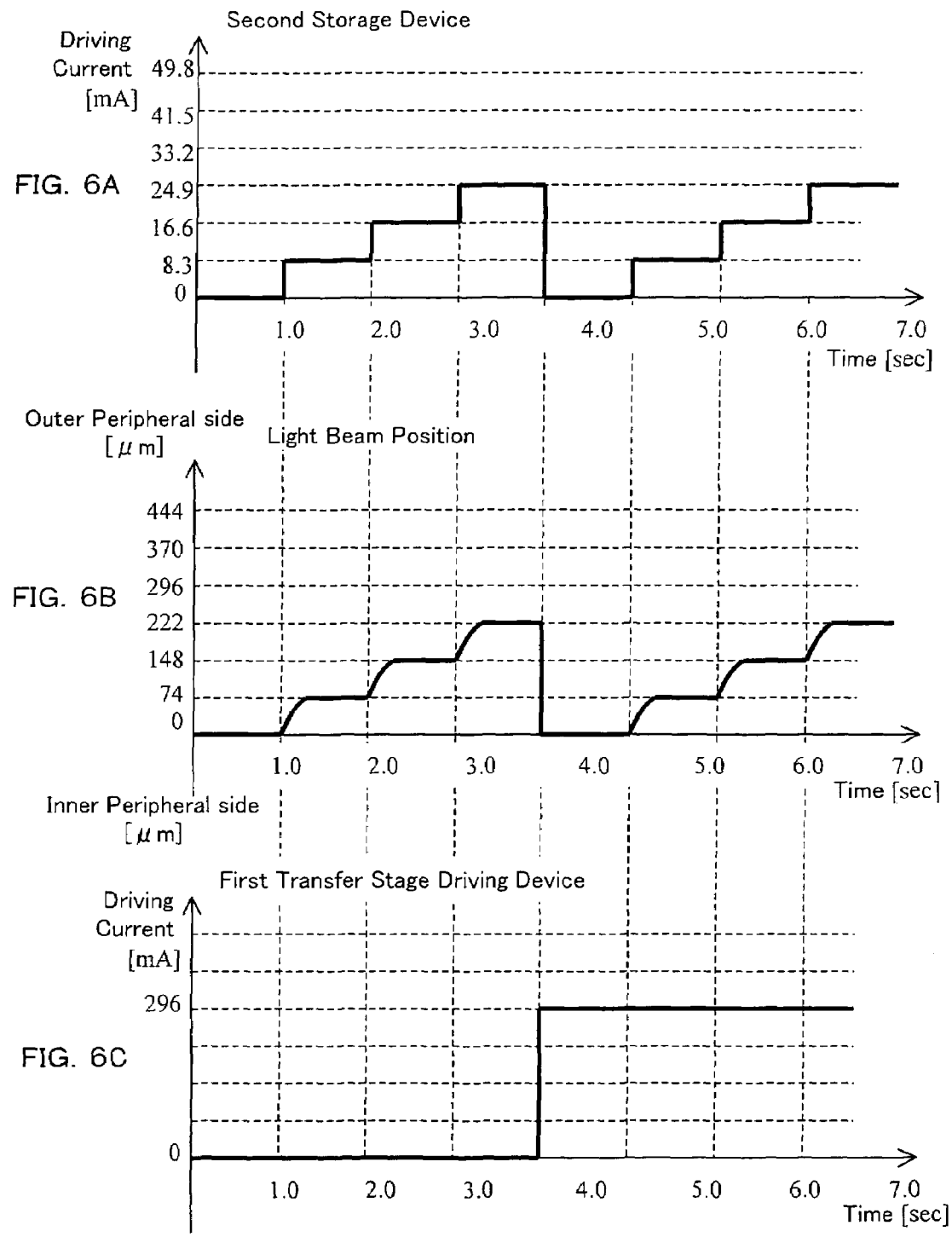
FIGS. 6A, 6B, 6C are graphs used for describing control which is performed by data stored in each of the first and second storage devices according to the second preferred embodiment of the present invention.

In this embodiment, like the first preferred embodiment, the first tracking control information by the objective lens 2-6 shown in FIG. 2 and FIG. 3 is obtained and stored in the first storage device 5 by means of the tracking error detector 3, the tracking error counter 4, the first storage device 5, the tracking driving device 6, and the lens shift driving device 7. Further, by means of the tracking error detector 3, the tracking error counter 4, the second storage device 12, the first transfer table driving device 13, and the second transfer table driving device 14, the second tracking control information by the transfer table 10, which will be described by referring to FIG. 6, is obtained and stored in the second storage device 12.

That is, in addition to control of storing the above-mentioned first tracking control information to the first storage device 5, the microcomputer 9 drive-controls the second transfer table driving device 14. The second transfer table driving device 14 drives the transfer table 10 by supplying driving current to the transfer table 10 through a second switch 15. Unlike the first preferred embodiment, by the drive of the transfer table 10, the optical pickup 2 is moved by the transfer table 10 in the tracking direction for a distance corresponding to the driving current. The tracking error by this shift is detected by the tracking error detector 3. Further, by the tracking error counter 4, the count value for corresponding to the number of tracks crossed by the light beam by the shift of the transfer table 10 is stored in the second storage device 12. The second storage device 12 stores 296 (mA) as the driving current corresponding to crossing four-hundred tracks. According to the driving current of 296 (mA) as the stored value of the second storage device 12, the first transfer table driving device 13 drives the transfer table 10 with respect to the label recording face through the second switch 15, and controls to move the optical pickup 2 in the tracking direction by a unit of four-hundred crossed tracks. The crossed track number is a unit of one hundred in the control by the first storage device 5, whereas it is a unit of four hundred in the control by the second storage device 12. Thus, the control speed of the light beam can be increased so that the recording speed of the label recording can be improved.

The action of this embodiment will be described by referring to FIG. 6. FIG. 6A indicates that the driving current stored in the first storage device 5 taken as the vertical axis increases by a unit of 8.3 (mA) by every single rotation/one second of the rotary motor 11 which is taken as the horizontal axis. FIG. 6B indicates the moved distance of the objective lens 2-6 taken as the vertical axis by every one second of the rotary motor 11 which is taken as the horizontal axis. FIG. 6C indicates the state where the transfer table 10 does not move until reaching four rotations of the rotary motor 11 which is taken as the horizontal axis, and the transfer table 10 moves for the amount of four-hundred crossed tracks when the rotation exceeds four times. When the number of tracks crossed by the light beam exceeds three hundred, the objective lens 2-6 cannot be moved any more in the tracking direction. The driving current of the tracking actuator 2-11 is set to be 0 (mA) and the objective lens 2-6 returns to the original position. Furthermore, the transfer table 10 moves to the position of four-hundred crossed tracks and the number of tracks crossed by the light beam reaches four hundred.

As described above, in addition to the same effects as those of the first preferred embodiment, this embodiment enables to expand a range of possible label recording. In this embodiment, when the moving distance of the objective lens 2-6 in the tracking direction reaches the maximum, the transfer table 10 is moved in the tracking direction thus enabling the light beam to cross four-hundred tracks or more.

This embodiment may comprises only the second storage device 12, the first transfer table driving device 13, and the second transfer driving device 14 and omit the lens shift driving device 7, the first storage device 5, and the tracking driving device 6.

Third Preferred Embodiment

Figure 7:
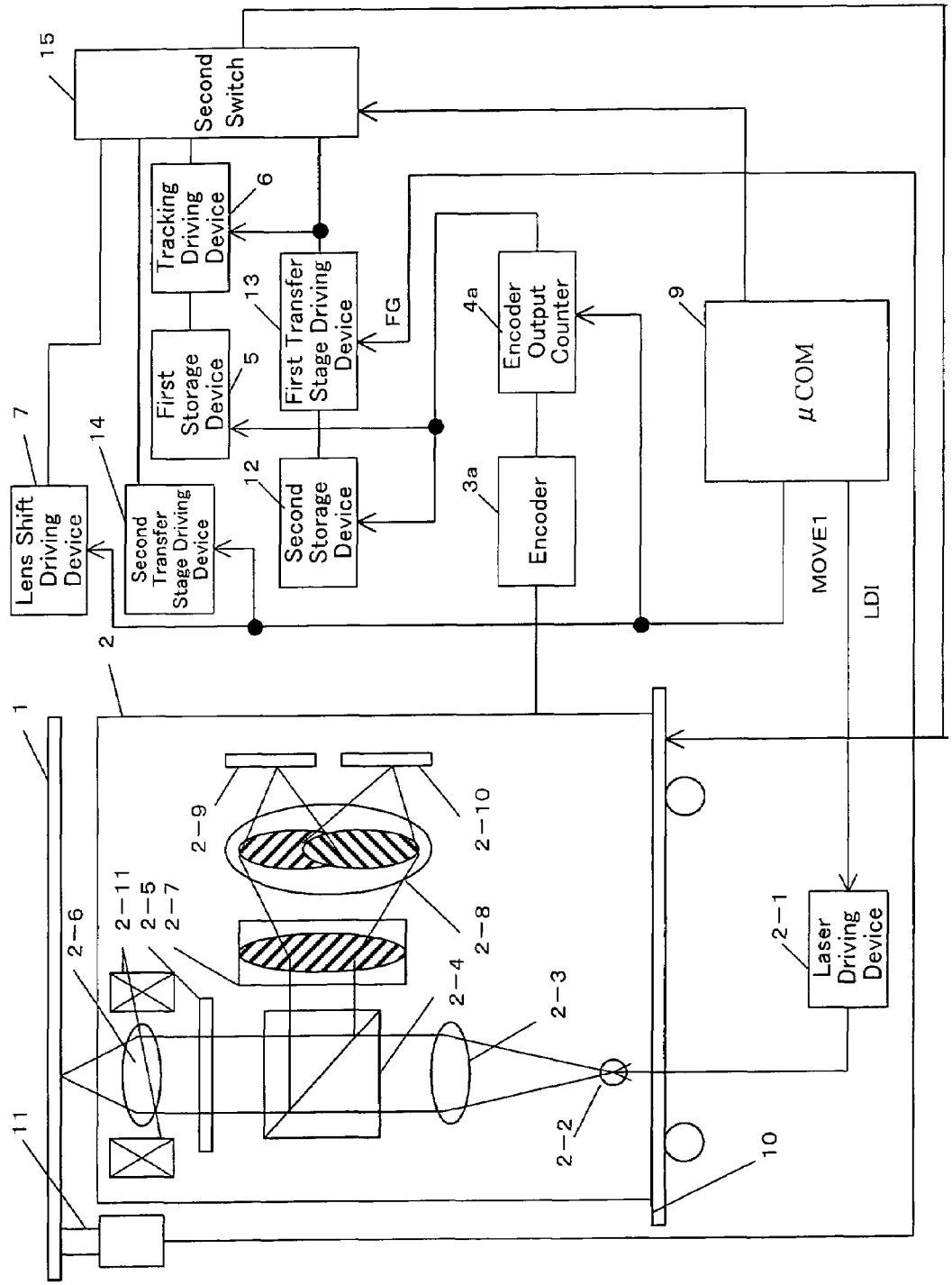
FIG. 7 is a block diagram of an optical disk device according to a third preferred embodiment of the present invention.

A third preferred embodiment will be described by referring to FIG. 7. In this embodiment, the tracking error detector 3 of the second preferred embodiment is replaced with an encoder 3a, and the tracking error counter 4 is replaced with an encoder output counter 4a, respectively. Other structures are the same as those of the second preferred embodiment. The encoder counter 4a constitutes a counter which performs counting action in accordance with the shift of the transfer table 10. In this embodiment, the encoder 3a outputs pulse output corresponding to the shift of the transfer table 10 by a unit distance of the transfer table 10. That is, the encoder output is an output of information on the moved distance of the optical pickup 2 in the track direction. When the output of the encoder 3 corresponds to four-hundred crossed tracks, encode information is outputted to the encoder output counter 4a. The encoder output counter 4a counts the encode information and outputs the count value to the second storage device 12. The action thereafter is the same as that of the second preferred embodiment so that the detail will be omitted.

As described above, in addition to the same effects as those of the first preferred embodiment, this embodiment enables to expand a range of possible label recording. In this embodiment, when the moving distance of the objective lens 2-6 in the tracking direction reaches the maximum, the transfer table 10 is moved in the tracking direction thus enabling the light beam to cross four-hundred tracks or more.

This embodiment may comprises only the second storage device 12, the first transfer table driving device 13, and the second transfer driving device 14 and omit the lens shift driving device 7, the first storage device 5, and the tracking driving device 6.

(2) Embodiments for the Second Aspect of the Present Invention

Fourth Preferred Embodiment

A fourth preferred embodiment will be described by referring to FIG. 8. In order to improve the precision of label recording, to decrease non-uniform recording, and to improve the recording quality, in the optical disk device of this embodiment, the relative rotation speed of the optical disk 1 with respect to the optical pickup 2 is set constant both in the inner peripheral side of the optical disk 1 and the outer peripheral side of the optical disk 1. It is for controlling the rotation speed of the optical disk 1 to be fast on the inner peripheral side and to be slow on the outer peripheral side.

Figure 8:
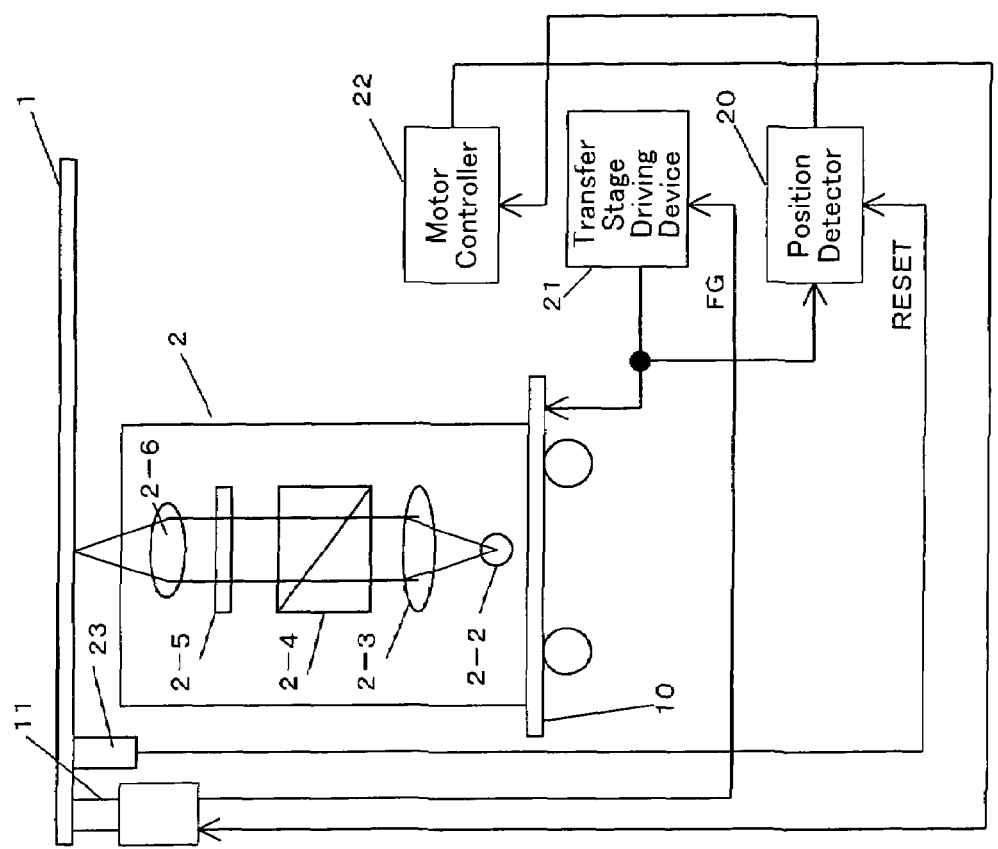
FIG. 8 is a block diagram of an optical disk device according to a fourth preferred embodiment of the present invention.

Referring to FIG. 8, this optical disk device performs label recording by irradiating the light beam onto the label recording face of the optical disk 1, which is an opposite-side face at a position different from that of the disk recording face. This optical disk device comprises a rotary motor 11 as a rotary device for rotation-driving the optical disk 1, and a position detector 20 which detects the irradiation position of the light beam in the radius direction of the optical disk 1. This optical disk device controls the circumferential speed at the arbitrary position in the radius direction of the optical disk 1 achieved by the rotary motor 11 to be constant in accordance with the detection output of the position detector 20. With this, there is achieved a CLV system in which the rotation speed of the optical disk 1 is controlled to be fast on the inner peripheral side and to be slow on the outer peripheral side.

Reference numeral 1 is an optical disk, 2 is an optical pickup, 10 is a transfer table, 11 is the rotary motor, 20 is the position detector, 21 is a transfer table driving device, 22 is a motor controller, and 23 is an inner periphery position detector of the optical disk 1. Unlike the first to third preferred embodiments, the optical pickup 2 comprises a laser 2-2, a coupling lens 2-3, a beam splitter 2-4, a ¼ wave plate 2-5, and an objective lens 2-6, and other structures are omitted.

Specifically, the inner periphery position detector 23 constituted with a proximity switch and the like is abutted against the transfer table 10, and a reset signal (RESET) is issued/outputted to the position detector 20. The position at which the transfer table 10 abuts against the inner periphery position detector 23 indicates that the optical pickup 2 mounted on the transfer table 10 is located at an inner peripheral position of the optical disk 1. The transfer table 10 is moved towards the inner peripheral side of the optical disk 1 so as to locate the optical pickup 2 at an inner peripheral position of the optical disk 1. Then, the transfer table driving device 21 outputs a driving signal to the transfer table 10 so as to move the transfer table 10 towards the outer peripheral side in the radius direction of the optical disk 1. The driving signal from the transfer table driving device 21 is counted by the position detector 20 for detecting the position of the transfer table 10 in the radius direction of the optical disk 1. In other words, the count value of the position detector 20 indicates the position of the transfer table 10 in the radius direction of the optical disk 1. In accordance with the detected position of the transfer table 10 in the radius direction of the optical disk 1, the motor controller 22 determines the motor driving current of the rotary motor 11, and feeds back the motor driving current to the rotary motor 11. In this case, the motor controller 22 controls to reduce the driving current for the rotary motor 11 in accordance with the position of the transfer table 10 moved from the inner peripheral side towards the outer peripheral side in the radius direction of the optical disk 1. With this, the rotary motor 11 rotates fast when the optical pickup 2 mounted on the transfer table 10 is located on the inner peripheral side in the radius direction of the optical disk 1. In the meantime, the rotary motor 11 rotates slowly when the optical pickup 2 is located on the outer peripheral side in the radius direction of the optical disk 1.

In this embodiment, a CLV system is achieved in which the relative rotation speed of the optical pickup 2 with respect to the optical disk 1 is controlled to be constant at an arbitrary position in the radius direction of the optical disk 1. Thus, the precision of label recording is improved and non-uniform recording is decreased. As a result, it enables to improve the recording quality of label recording.

Figure 9:
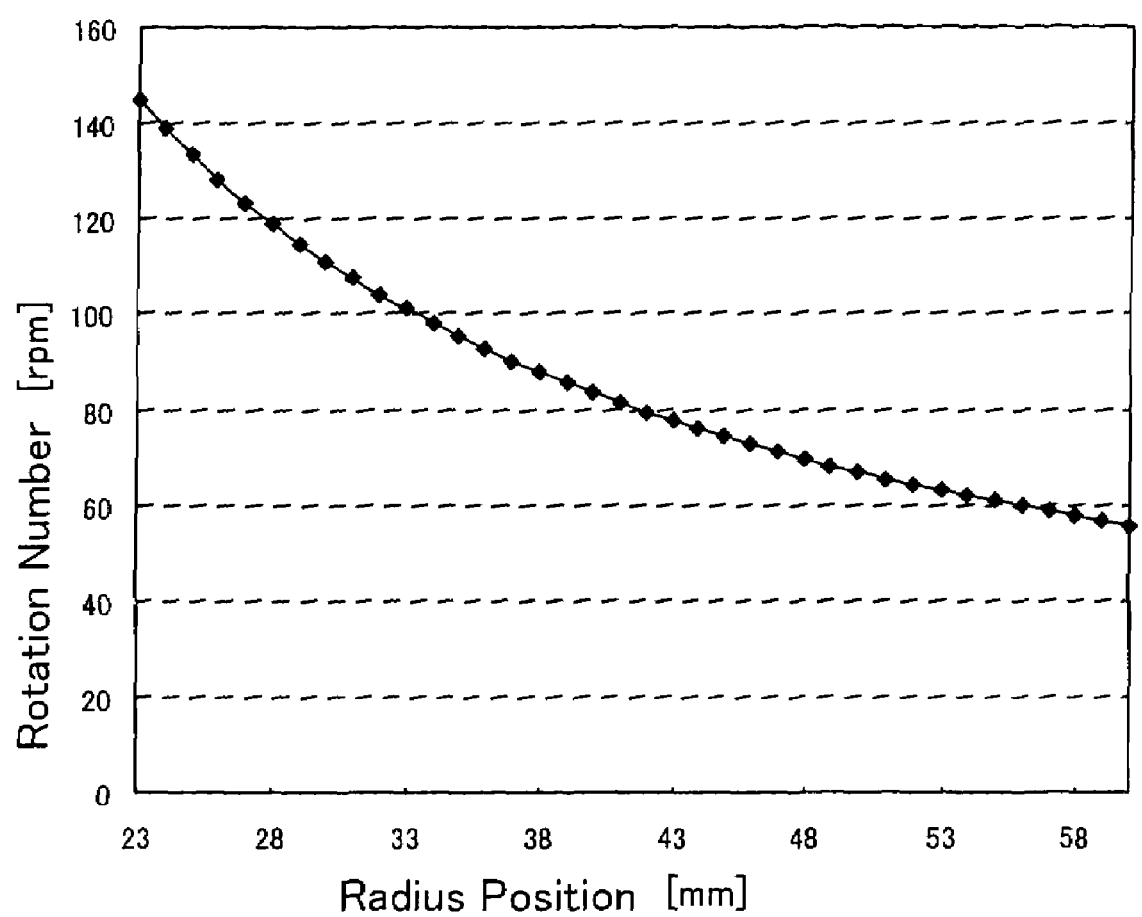
FIG. 9 is a graph used for describing the case of performing a constant control of a rotation speed of the optical disk according to the fourth preferred embodiment of the present invention.

In FIG. 9, the vertical axis is the rotation speed (rpm) of the optical disk 1, and the horizontal axis is the radius-direction position (mm) of the transfer table 10. As can be seen form FIG. 9, as the transfer table 10 is moved towards the outer peripheral side in the radius direction of the optical disk 1, the rotation speed of the rotary motor 11 is deteriorated. As a result, the relative rotation speed of the optical disk 1 with respect to the optical pickup 2 becomes constant.

Fifth Preferred Embodiment

Figure 10:
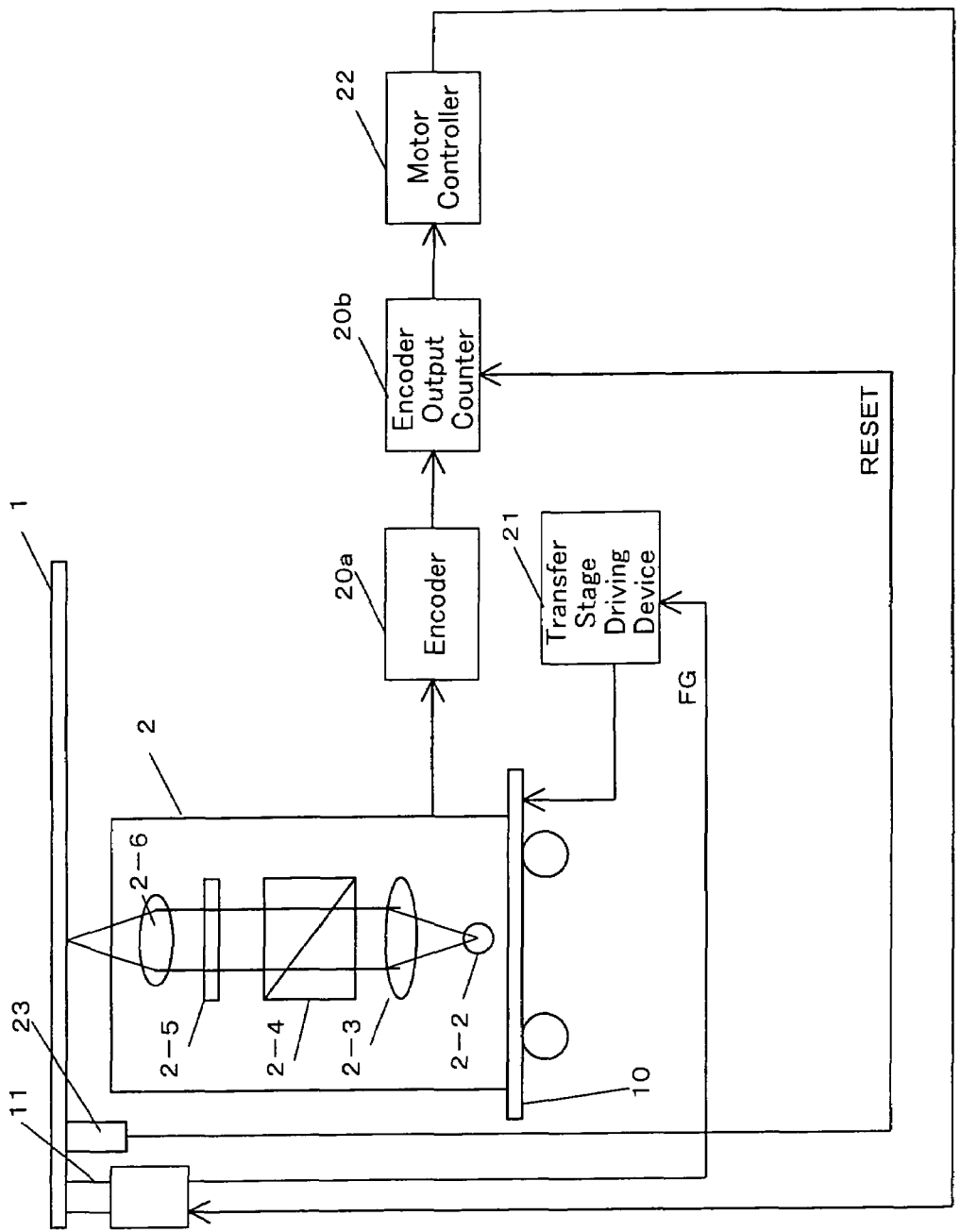
FIG. 10 is a block diagram of an optical disk device according to a fifth preferred embodiment of the present invention.

A fifth preferred embodiment will be described by referring to FIG. 10. The optical disk device of this embodiment is the same as the one shown in FIG. 8 except that the position detector 20 of the forth preferred embodiment is constituted with an encoder 20a and an encoder output counter 2b herein. In this embodiment, the encoder 20a encodes the transfer position of the transfer table 10 and the encoder output counter 20b counts the output of the encoder 20a.

Therefore, like the fourth preferred embodiment, this embodiment also enables to control (CLV system) the relative rotation speed of the optical disk 1 with respect to the optical pickup 2 to be constant. Thus, it is possible to improve the precision of label recording and decrease non-uniform recording thereby improving the recording quality.

(3) Embodiments for the Third Aspect of the Present Invention

Sixth Preferred Embodiment

Figure 11:
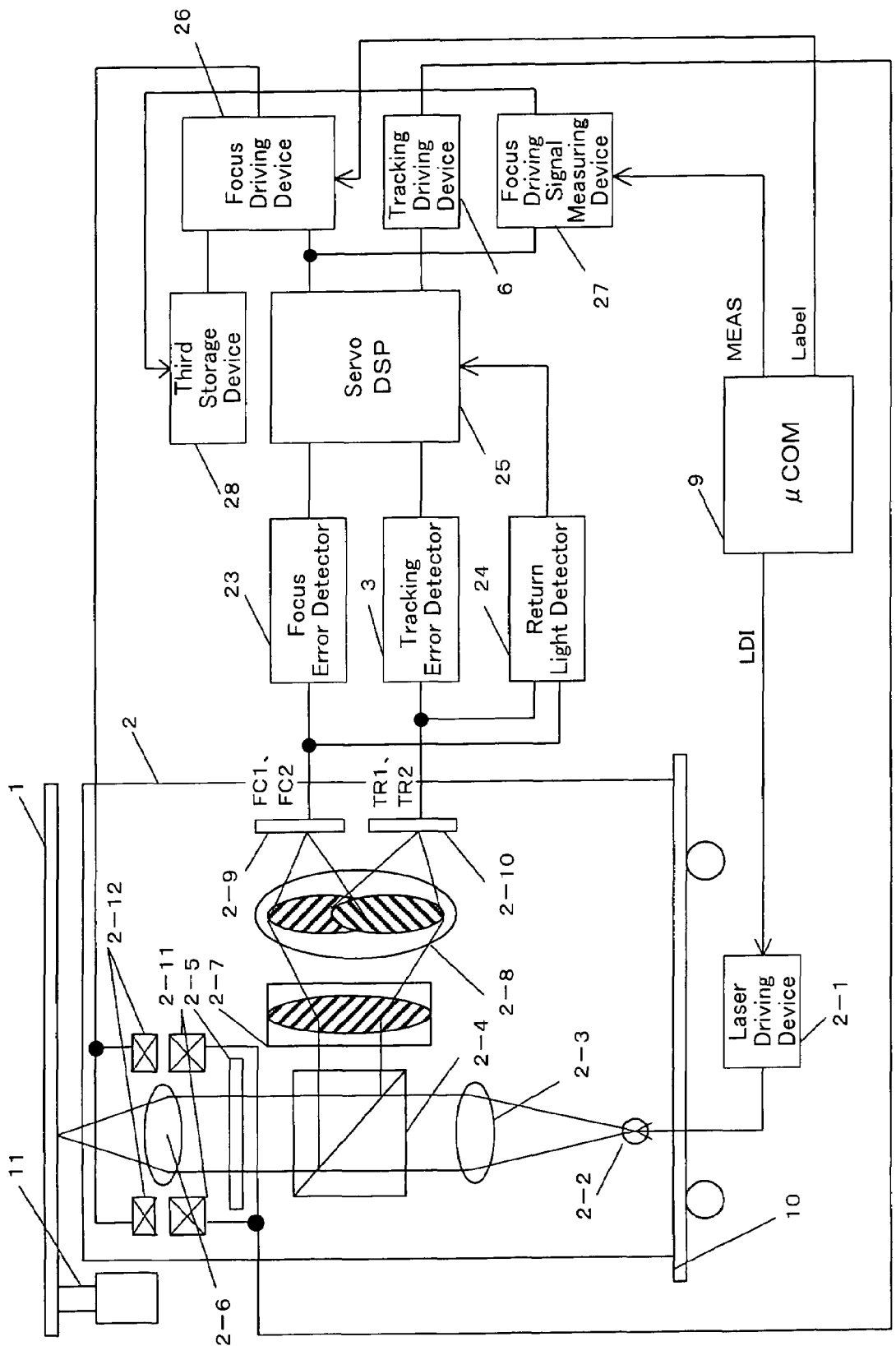
FIG. 11 is a block diagram of an optical disk device according to a sixth preferred embodiment of the present invention.

On the label recording face, the same focus control as that performed on the disk recording face cannot be performed. However, in a sixth preferred embodiment shown in FIG. 11, it is possible to detect focus errors on the label recording face as well and the focus deviation of label recording can be suppressed.

The optical disk device of this embodiment performs label recording by irradiating the light beam onto a label recording face of the optical disk 1, which is an opposite-side face at a position different from that of the disk recording face. This apparatus comprises a focus actuator 2-12 for arbitrarily moving the focus position of the light beam in the vertical direction of the disk recording face, and a third storage device 28 which stores driving signals for the focus actuator 2-12 for performing either recording or reproduction of data to/from the disk recording face. The focus position of the light beam with respect to the label recording face is determined using the driving signal for the focus actuator 2-12, which is stored in the third storage device 28.

Reference numeral 1 is an optical disk, 2 is an optical pickup, 3 is a tracking error detector, 6 is a tracking driving device, 9 is a microcomputer, 10 is a transfer table, 11 is a rotary motor, 23 is a focus error detector, 24 is a return light detector, 25 is a servo (DSP: digital signal processor), 26 is a focus driving device, 27 is a focus driving signal measuring device, and 28 is the third storage device. Further, this embodiment is also provided with the above-mentioned focus actuator 2-12 in addition to the tracking actuator 2-11.

The output of a plus primary light detector 2-9 of the optical pickup 2 is supplied to the focus error detector 23. The output of a minus primary light detector 2-10 of the optical pickup 2 is supplied to the tracking error detector 3. The outputs of both the primary light detectors 2-9, 2-10 are supplied to the return light detector 24. The outputs of the focus error detector 23, the tracking error detector 3, and the return light detector 24 are supplied to the servo 25. The output of the servo 25 is supplied to the tracking driving device 6, the focus driving device 26, and the focus driving signal measuring device 27. The output of the focus driving device 26 is supplied to the focus actuator 2-12. The output of the focus driving signal measuring device 27 is supplied to the third storage device 28. The microcomputer 9 drive-controls the focus driving device 26, the focus driving signal measuring device 27, and the laser driving device 2-1. Detailed description of other structural elements having the same reference numerals as those of the above-described embodiments will be omitted.

In the optical disk device of this embodiment, first, the focus error detector 23 receives the detection output from the plus primary light detector 2-9, the tracking error detector 3 receives the detection output from the minus primary light detector 2-10, and to the return light detector 24 receives the detection outputs from both the plus primary light detector 2-9 and the minus primary light detector 2-10. The focus error detector 23 and the tracking error detector 3 output the respective detection outputs to the servo 25. Based on each detection output of the focus error detector 23 and the tracking error detector 3, the servo 25 performs controls of the focus and tracking so that the return light, which is the detection output of the return light detector 24, becomes a prescribed value or more, and preferably to be the maximum. When the return light becomes a prescribed value or more, or preferably the maximum in this manner, the focus driving signal measuring device 27 measures the focus driving signal supplied from the servo 25 and stores the measurement result to the third storage device 28. Then, at the time of label recording, the focus driving device 26 drives the focus actuator 2-12 according to the focus driving signal stored in the third storage device 28. With this, the light beam is focused onto the label recording face thereby enabling to perform high-quality label recording.

In the optical disk device of this embodiment, even if the focus error cannot be detected at the time of label recording due to the fact that the reflection light from the disk label face is extremely small or the disk label face is uneven, it is possible to focus the light beam onto the label recording face. Thus, high-quality label recording can be achieved.

It is preferable to store, to the third storage manes 28, the driving signal for the focus actuator 2-12, which is obtained when tracking control information detected by the tracking error detector 3 at the time of performing recording or reproduction of data to/from the disk recording face becomes a prescribed value or more, or preferably the maximum value.

In this embodiment, like the first preferred embodiment, it is preferable that the stored contents of the third storage device 28 can be updated.

Seventh Preferred Embodiment

Figure 12:
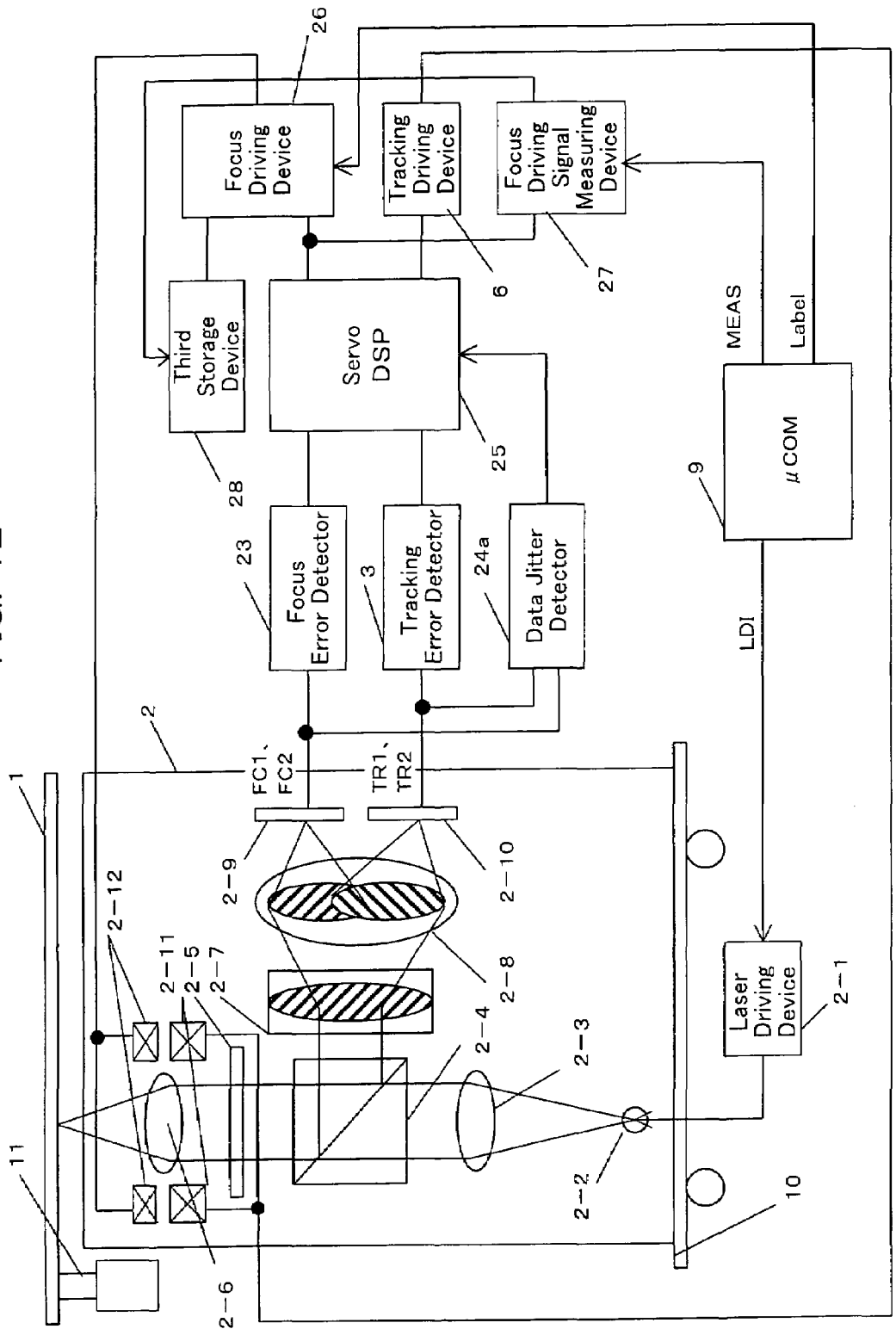
FIG. 12 is a block diagram of an optical disk device according to a seventh preferred embodiment of the present invention.

FIG. 12 shows the optical disk device of a seventh preferred embodiment. Like the sixth preferred embodiment, it is possible in this embodiment to detect the focus errors on the label recording face and suppress the focus deviation at the time of label recording.

The optical disk device of this embodiment has a structure in which the return light detector 24 of the sixth preferred embodiment is replaced with a data jitter detector 24a. Like the return light detector 24, in the data jitter detector 24a, the focus driving signal measuring device 27 measures the focus driving signal by which the data jitter becomes a prescribed value or less, or preferably the minimum when focused, and the focus driving signal thereof is stored in the third storage device 28. Therefore, like the sixth preferred embodiment, at the time of label recording in this embodiment, the focus driving device 26 drives the focus actuator 2-12 according to the focus driving signal stored in the third storage device 28. With this, the light beam is focused onto the label recording face so that high-quality label recording can be performed.

In this embodiment, it is also preferable that the stored contents of the third storage device 28 can be updated like the first preferred embodiment.

Eighth Preferred Embodiment

Figure 13:
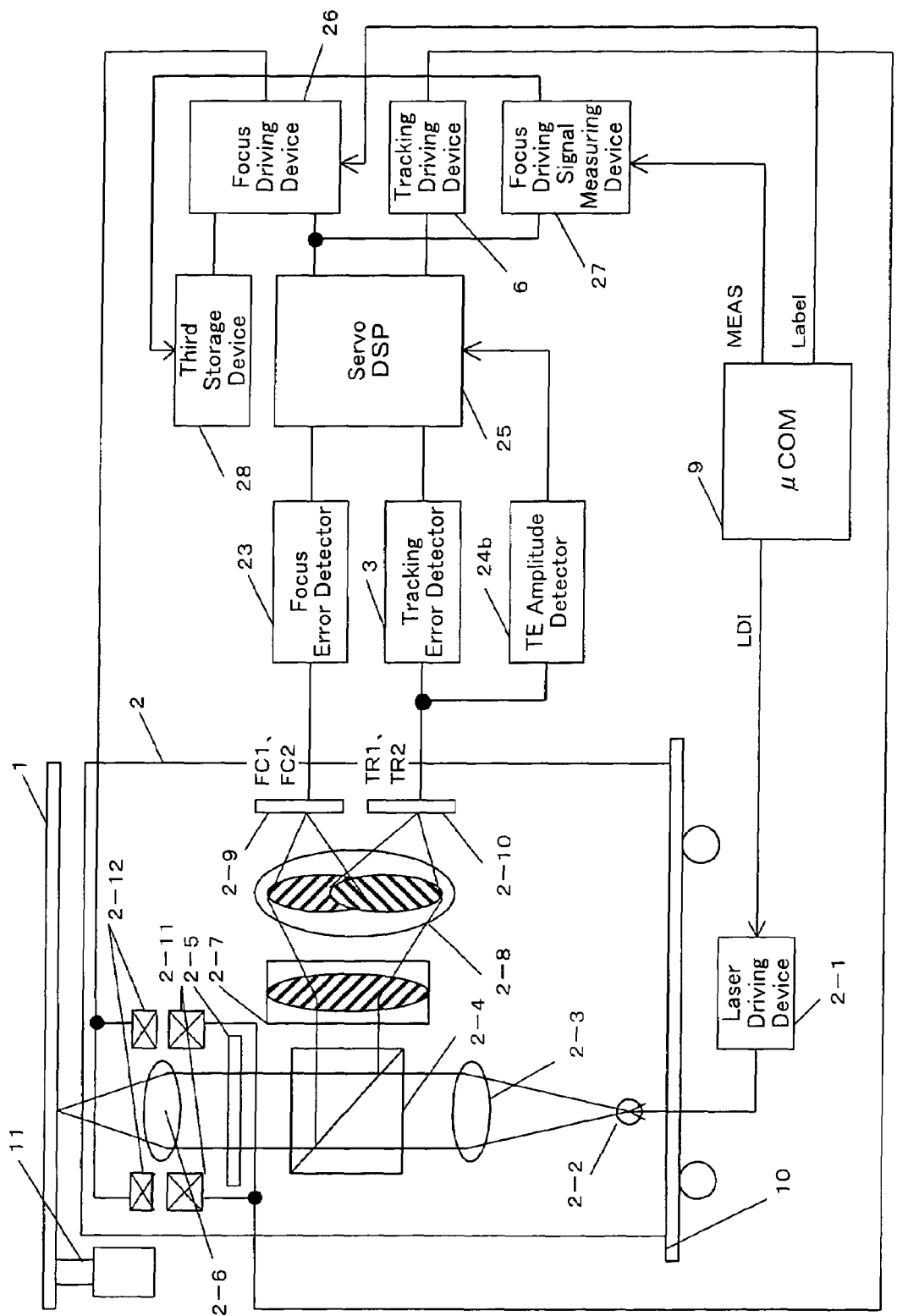
FIG. 13 is a block diagram of an optical disk device according to an eighth preferred embodiment of the present invention.

FIG. 13 shows the optical disk device according to an eighth preferred embodiment. Like the sixth preferred embodiment, it is possible in this embodiment to detect the focus errors on the label recording face and suppress the focus deviation at the time of label recording.

This embodiment is different from the sixth preferred embodiment in respect that the return light detector 24 is replaced with a tracking error amplitude detector 24b. Like the return light detector 24, in the tracking error amplitude detector 24b, the focus driving signal measuring device 27 measures the focus driving signal by which the tracking error amplitude becomes a prescribed value or less, or preferably the minimum when focused, and the focus error signal thereof is stored in the third storage device 28. Therefore, like the sixth preferred embodiment, at the time of label recording in this embodiment, the focus driving device 26 drives the focus actuator 2-12 according to the focus driving signal stored in the third storage device 28. With this, the light beam is focused onto the label recording face so that high-quality label recording can be performed.

In this embodiment, it is also preferable that the stored contents of the third storage device 28 can be updated like the first preferred embodiment.

(4) Embodiments for the Fourth Aspect of the Present Invention

Ninth Preferred Embodiment

Figure 14:
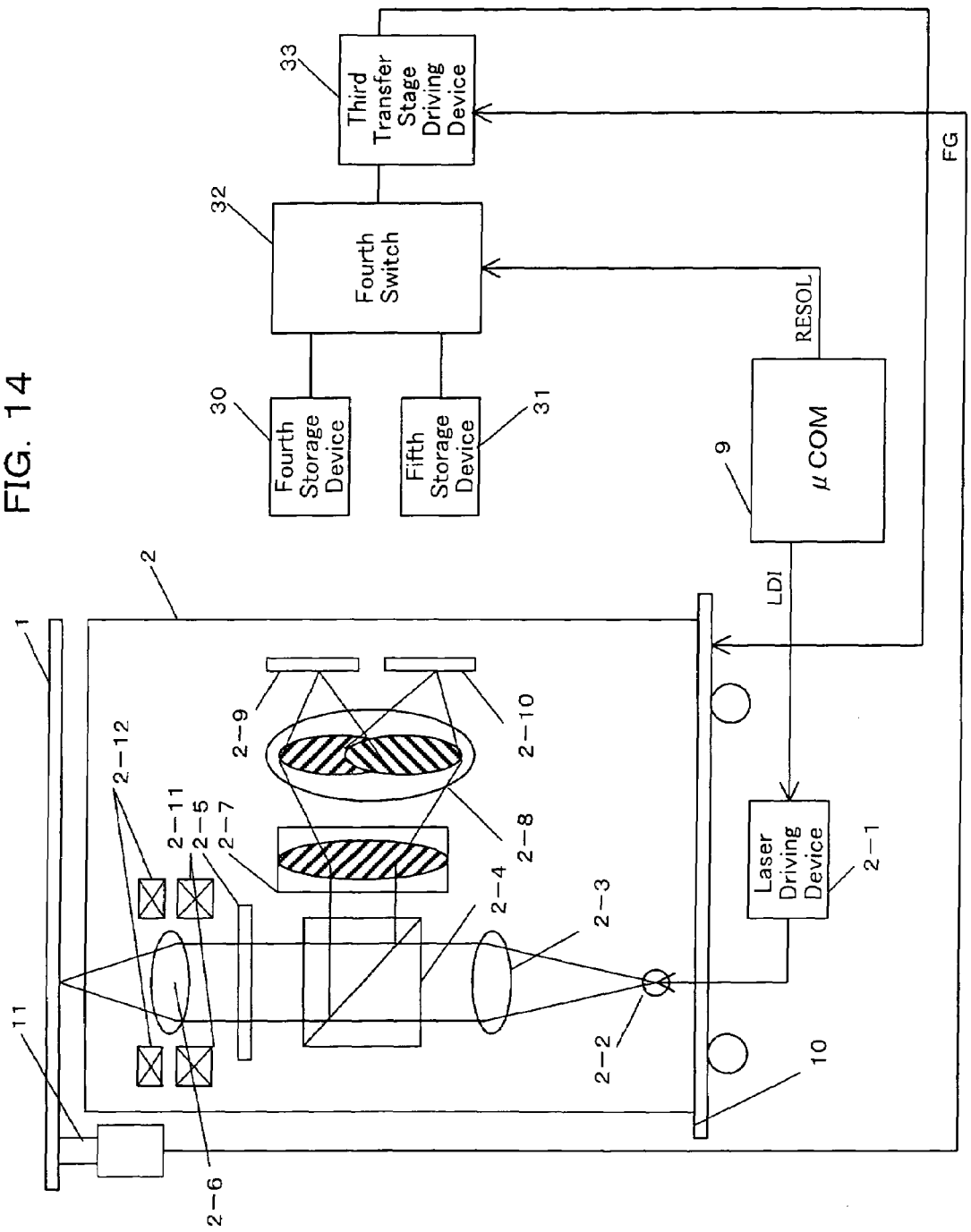
FIG. 14 is a block diagram of an optical disk device according to a ninth preferred embodiment of the present invention.

FIG. 14 shows the optical disk device of a ninth preferred embodiment. In the optical disk device of this embodiment, label recording is performed by irradiating the light beam onto a label recording face of the optical disk 1, which is an opposite-side face at a position different from that of the disk recording face. This apparatus comprises fourth and fifth storage device 30, 31 as storage device for storing data indicating whether the priority should be given to the recording speed of label recording performed on the label recording face or to the resolution of images of the label recording, and a fourth switch 32 as a selecting device for selecting the data stored in the storage devices 30, 31. When the data selected through the fourth switch 32 from the storage devices 30, 31 is the data of the storage device 30, which is a first data giving the priority to the recording speed of label recording rather than the resolution, the light beam is moved on the label recording face at a high speed. When it is the data of the storage device 31, which is a second data giving the priority to the resolution of the images of the label recording rather than the recording speed, the light beam is moved on the label recording face at a low speed. With this, it enables to fulfill a demand that is to shorten the time required for recording on the label recording face even though the resolution is not high, or a demand that is to attain the label recording image with high resolution even though it takes time to perform label recording.

In the followings, it will be described in more detail. Reference numeral 1 is an optical disk, 2 is an optical pickup, 9 is a microcomputer, 10 is a transfer table, 11 is a rotary motor, 30 is the fourth storage device, 31 is the fifth storage device, 32 is the fourth switch, and 33 is a third transfer table driving device.

In this embodiment, the relation between the resolution of the label image and the label recording speed is as follows:

(a) In a first mode which gives the priority to the label recording speed, the resolution of the label image is decreased and the label recording speed is increased.

(b) In a second mode which gives the priority to the resolution of the label image, the resolution of the label image is increased and the label recording speed is decreased.

In this embodiment, the microcomputer 9 switches the fourth switch 32 on the fourth storage device 30 side in the first mode which gives the priority to the recording speed, and switches the fourth switch 32 on the storage device 31 side in the second mode which gives the priority to the resolution.

Figure 15:
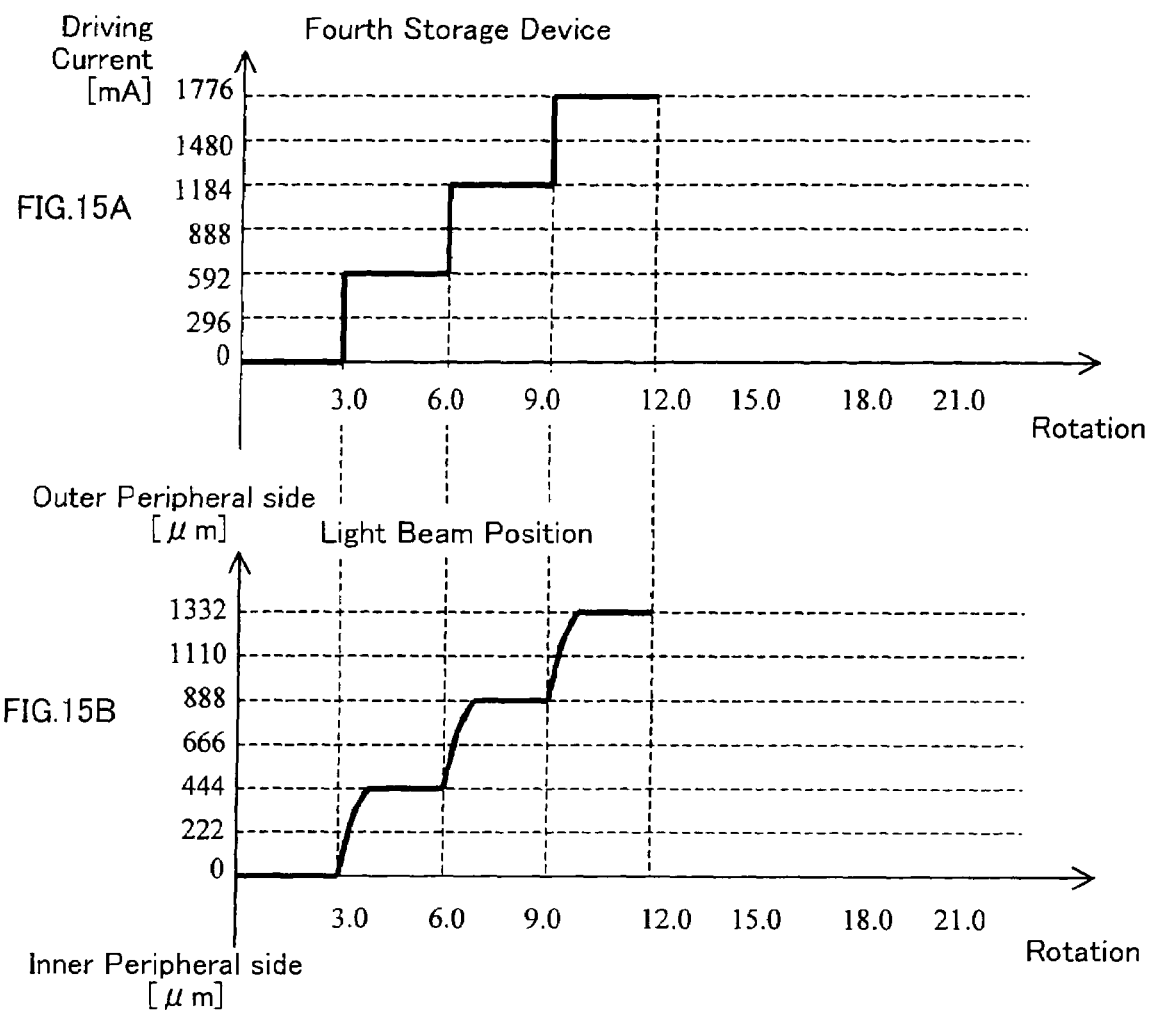
FIGS. 15A, 15B are graphs used for describing control which is performed according to data of a fourth storage device according to the ninth preferred embodiment of the present invention.

FIG. 15 illustrates the output of the fourth storage device 30 when the first mode is selected, and the behavior of the light beam positions on the label face of the disk 1. FIG. 15A takes the output of the fourth storage device 30 as the vertical axis, and FIG. 15B takes the light beam positions on the label face of the disk 1. In both graphs, the horizontal axis is the number of rotation of the rotary motor 11. In the fourth storage device 30, stored is the driving current data for driving the third transfer table driving device 33 at a high speed. That is, the driving current is outputted to the transfer table 10 by adding 592 (mA) every time the rotary motor 11 rotates three times. As a result, the light beam positions on the label face of the disk 1 is moved towards the outer peripheral direction by 444 (μm) as shown in FIG. 15B.

Figure 16:
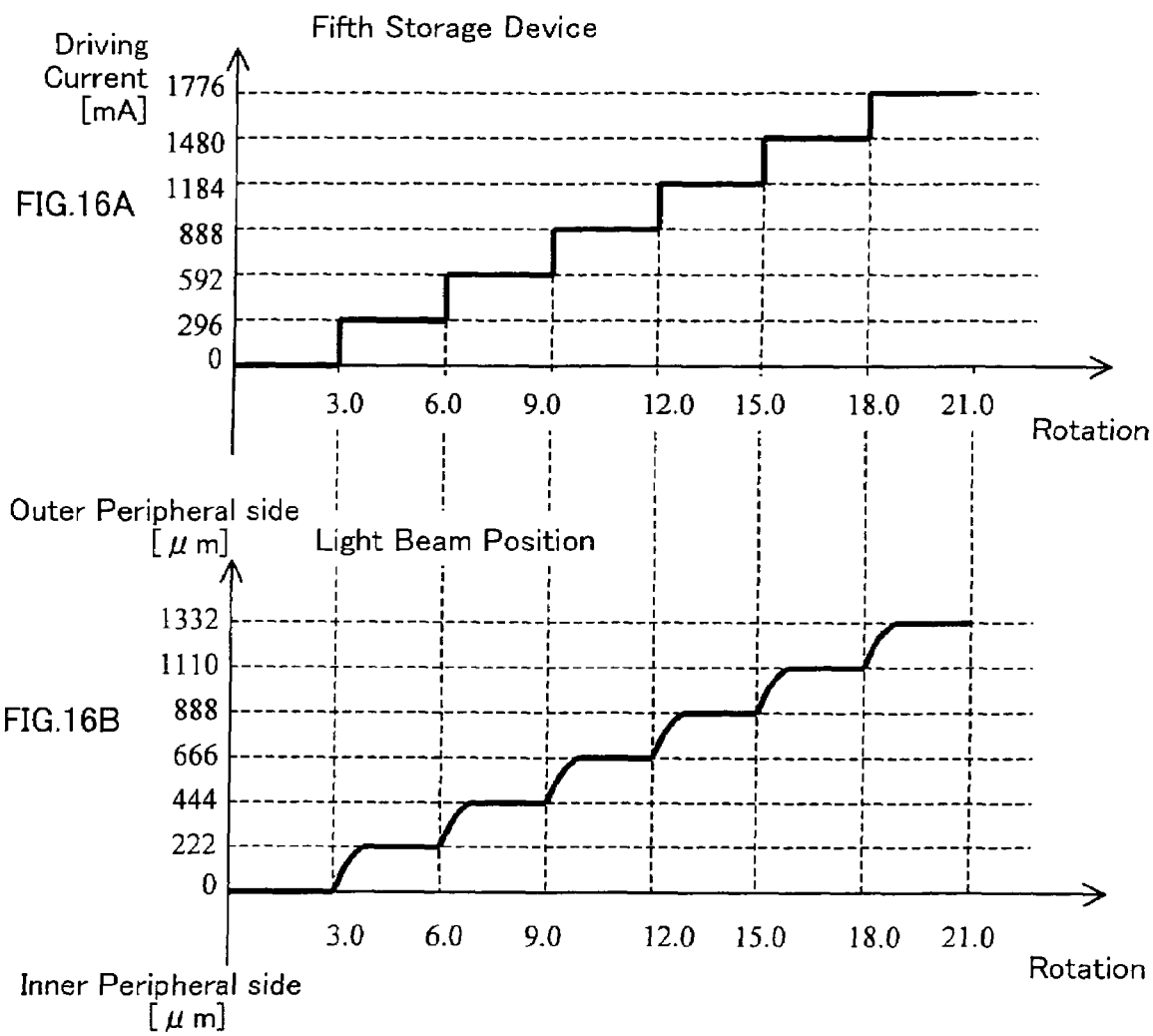
FIGS. 16A, 16B are graphs used for describing control which is performed according to data of a fifth storage device according to the ninth preferred embodiment of the present invention.

Further, in the fifth storage device 31, stored is the driving current data for driving the third transfer driving device 33 at a low speed. FIG. 16 illustrates the output of the fifth storage device 31 when the second mode is selected, and the behavior of the light beam positions on the label face of the disk 1. FIG. 16A takes the output of the fifth storage device 31 as the vertical axis, and FIG. 16B takes the light beam positions on the label face of the disk 1. In both graphs, the horizontal axis is the number of rotation of the rotary motor 11. The driving current is outputted to the transfer table 10 by adding 296 (mA) every time the rotary motor 11 rotates three times. As a result, the light beam positions on the label face of the disk 1 is moved towards the outer peripheral direction by 222 (μm) as shown in FIG. 16B.

Thus, in the first mode, the third transfer driving device 33 is driven at a high speed. As a result, the transfer table 10 moves at a high speed on the label recording face of he optical disk 1 so that recording is performed on the label recording face at a high speed even though the resolution of the label image is deteriorated. In the second mode, the third transfer table driving device 33 is driven at a low speed. As a result, the transfer table 10 moves at a low speed on the label recording face of the optical disk 1 so that, even though at a low speed, the label image with the improved resolution is recorded.

Although not shown, by combining the optical disk device of this embodiment and the optical disk device of the first preferred embodiment, i.e. by combining the structure of the optical disk device shown in FIG. 14 with the optical disk device shown in FIG. 1, the light beam irradiation control information by the optical pickup for the tracks of the disk recording face can be used for performing label recording on the label recording face. Also, it enables to achieve the optical disk device which can switchably select the priority to be given either to the recording speed for the label recording or to the resolution of the label recording image.

Tenth Preferred Embodiment

Figure 17:
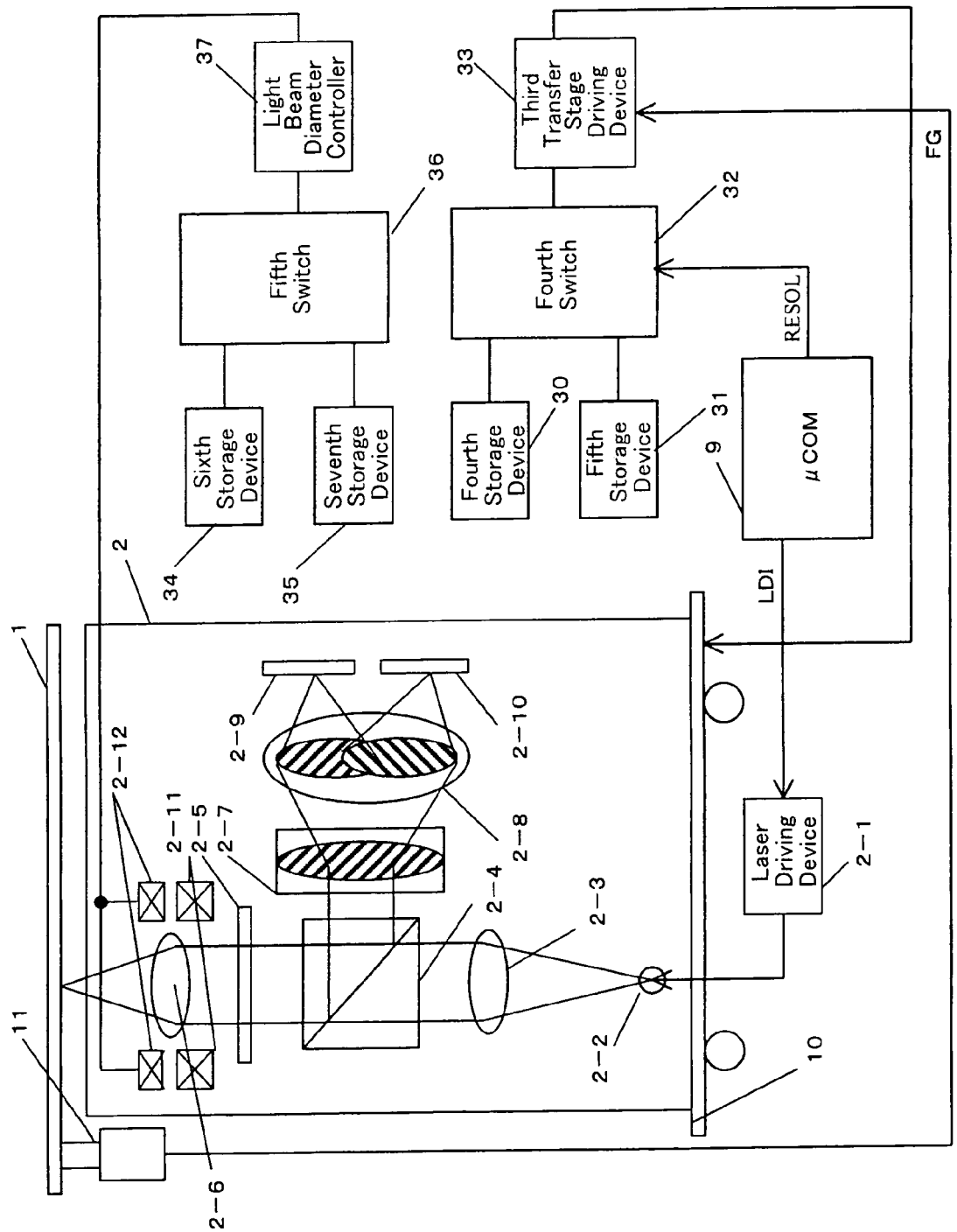
FIG. 17 is a block diagram of an optical disk device according to a tenth preferred embodiment of the present invention.

A tenth preferred embodiment will be described by referring to FIG. 17. FIG. 17 is an illustration for showing the block structure of the optical disk device according to this embodiment. The same reference numerals are applied to the elements which correspond or similar to those of the optical apparatus shown in FIG. 14.

Like the ninth preferred embodiment, this embodiment comprises the fourth and fifth storage devices 30, 31 as storage devices for storing data indicating whether the priority should be given to the recording speed of label recording performed on the label recording face or to the resolution of images of the label recording, and a fourth switch 32 as a selecting device for selecting data stored in the storage devices 30, 31. When the data selected through the fourth switch 32 from the storage devices 30, 31 is the data of the storage device 30, which is a first data giving the priority to the recording speed of label recording rather than the resolution, the light beam is moved on the label recording face at a high speed. When it is the data of the storage device 31, which is a second data giving the priority to the resolution of the images of the label recording rather than the recording speed, the light beam is moved on the label recording face at a low speed.

This embodiment is different from the ninth preferred embodiment in respect that a sixth storage device 34, a seventh storage device 35, a fifth switch 36, and a light beam diameter controller 37 are provided in addition.

In this embodiment, when the data selected through the fourth switch 32 from the storage devices 30, 31 is the data of the storage device 30, which is the first data giving the priority to the recording speed of label recording rather than the resolution, the light beam is moved on the label recording face at a high speed. When it is the data of the storage device 31, which is the second data giving the priority to the resolution of the images of the label recording rather than the recording speed, the light beam is moved on the label recording face at a low speed. Furthermore, when the data selected through the fifth switch 36 from the storage devices 34, 35 is the data of the sixth storage device 34, which is the first data giving the priority to the recording speed of label recording rather than the resolution, size of the light beam diameter to be irradiated onto the label recording face is increased. When it is the data of the seventh storage device 35, which is the second data giving the priority to the resolution of the images of the label recording rather than the recording speed, the light beam diameter is reduced. The light beam diameter controller 37 controls the light beam diameter by driving the focus actuator 2-12 according to the output of the fifth switch 36.

Switching the size of the light beam diameter according to the first or the second data controls the area of the label recording face irradiated by the light beam by a single rotation of the disk 1. If the light-beam-irradiated area of the label recording face increases, a visible image area which can be recorded by a single rotation of the disk increases. Thus, by increasing the moving distance per unit of the transfer table 10 in the track direction, the recording speed can be increased. If the light-beam-irradiated area of the label recording face decreases, the visible image area which can be recorded by a single rotation of the disk decreases. Thus, by decreasing the moving distance per unit of the transfer table 10 in the track direction, the resolution of the label recording image can be improved.

Although not shown, by combining the optical disk device of this embodiment and the optical disk device of the first preferred embodiment, i.e. by combining the structure of the optical disk device shown in FIG. 17 with the optical disk device shown in FIG. 1, the light beam irradiation control information by the optical pickup for the tracks of the disk recording face can be used for performing label recording on the label recording face. Also, it enables to achieve the optical disk device which can switchably select the priority to be given either to the recording speed for the label recording or to the resolution of the label recording image.

While the invention has been described and illustrated in detail, it is to be clearly understood that this is intended to be taken be way of illustration and example only and is not to be taken by way of limitation, the spirit and scope of this invention being limited only be the terms of the following claims.

What is claimed is:

1. An optical disk device for performing label recording by controlling an optical pickup to irradiate a light beam onto a label recording face of an optical disk, which is at a position different from a disk recording face, the optical disk device comprising:
   a driving device configured to drive a moving device which moves the optical pickup according to light beam irradiation control information for performing label recording onto said label recording face, wherein the light beam irradiation control information include at least one of tracking control information and traverse control information for said disk recording face; and
   a storage device configured to store said light beam irradiation control information.

2. The optical disk device according to claim 1, further comprising a transfer table which mounts said moving device, wherein
   said storage device is configured to store light beam irradiation control information performed through transfer of said transfer table.

3. The optical disk device according to claim 2, further comprising a counter configured to count action of number of tracks on said disk recording face in accordance with shift of said transfer table, wherein
   a count value of said counter as light beam irradiation control information through said shift of said transfer table is stored in said storage device, and said driving device is configured to drive said transfer table for recording onto said label recording face according to said count value.

4. The optical disk device according to claim 1, further comprising a transfer table which mounts said moving device, wherein
   said storage device stores light beam irradiation control information performed by said moving device and light beam irradiation control information performed through transfer of said transfer table.

5. The optical disk device according to claim 4, further comprising a counter configured to perform count action of number of tracks on said disk recording face in accordance with shift of said transfer table, wherein
   a count value is stored in said storage device, and said driving device drives said transfer table for recording onto said label recording face according to said count value.

6. The optical disk device according to claim 1, wherein stored contents of said storage device can be updated.

7. The optical disk device according to claim 1, wherein said storage device is further configured to store data indicating whether priority is given to recording speed of label recording performed on said label recording face or to resolution of label recording image, and the optical disk device further comprises a selecting device configured to select said data stored in said storage device, wherein
   a light beam is moved on said label recording face at a high speed in case data selected from said storage device by said selecting device is a first data which gives priority to said recording speed of said label recording rather than said resolution, and said light beam is moved on said label recording face at a low speed in case data selected from said storage device by said selecting device is a second data which gives priority to said resolution of said label recording image rather than said recording speed.

8. The optical disk device according to claim 7, further comprising a speed controller configured to control speed of said light beam.

9. The optical disk device according to claim 1, wherein said storage device is further configured to store data indicating whether priority is given to recording speed of label recording performed on said label recording face or to resolution of label recording image, and the optical disk device further comprises a selecting device configured to select said data stored in said storage device, wherein
   a light beam diameter irradiated onto said label recording face is increased and said light beam is moved on said label recording face at a high speed when data selected from said storage device by said selecting device is a first data which gives priority to said recording speed of said label recording rather than said resolution, and said light beam diameter irradiated onto said label recording face is decreased and said light beam is moved on said label recording face at a low speed when selected is a second data which gives priority to said resolution of said label recording image rather than said recording speed.

10. The optical disk device according to claim 9, further comprising a light beam diameter controller configured to control size of said light beam diameter.

* * * * *